United States Patent [19]

Badley et al.

[11] Patent Number: 5,599,887
[45] Date of Patent: Feb. 4, 1997

[54] CHROMIUM CATALYST COMPOSITIONS AND ETHYLENE POLYMERIZATION PROCESSES THEREWITH

[75] Inventors: Rickey D. Badley, Dewey, Okla.; Kent W. Rollmann, Searcy, Ark.; Max P. McDaniel, Bartlesville, Okla.

[73] Assignee: Phillips Petroleum Company, Bartlesville, Okla.

[21] Appl. No.: 450,046

[22] Filed: May 25, 1995

Related U.S. Application Data

[62] Division of Ser. No. 174,938, Dec. 28, 1993.

[51] Int. Cl.$^6$ ............................................. C08F 4/24
[52] U.S. Cl. ........................... 526/105; 526/106; 526/132; 526/352; 502/256
[58] Field of Search ........................... 526/105, 106, 526/132, 352

[56] References Cited

U.S. PATENT DOCUMENTS

| | | | |
|---|---|---|---|
| 4,368,302 | 1/1983 | Downs | 526/105 |
| 4,472,531 | 9/1984 | Speca et al. | 502/256 |
| 5,093,300 | 3/1992 | Vogels et al. | 502/256 |
| 5,208,309 | 5/1993 | McDniel et al. | 526/348.2 |

Primary Examiner—David W. Wu
Attorney, Agent, or Firm—Carl D. Corvin

[57] ABSTRACT

This invention provides a chromium catalyst system that comprises

[a] a support that comprises silica, wherein said support has a surface area to pore volume relationship as follows $$0.5 \leq \text{Pore volume} \leq f(SA)$$

wherein said f(SA) is $$(1.14 \times 10^{-7})(SA)^3 - (1.19 \times 10^{-4})(SA)^2 + (3.19 \times 10^{-2})(SA) + 0.20;$$

and

[b] a hexavalent chromium compound;
wherein the surface concentration of said hexavalent chromium on said support is from 0.25 to 1 hexavalent chromium atoms per square nanometer.

Another embodiment of this invention provides a process to homopolymerize ethylene, or copolymerize ethylene with a comonomer, said process comprises polymerizing ethylene with the above chromium catalyst composition.

24 Claims, 13 Drawing Sheets

Tan delta vs Mw for silica based catalysts activated at 750°C.

Shear response vs Mw for silica based catalysts activated at 750°C.

Tan delta for silica based catalysts with catalysts 4–9 included.

Tan delta vs Mw for silica/titania catalysts.

Shear response vs Mw for silica/titania based catalsts.

Effect of catalyst activation temperature on tan delta of polyethylene producted from catalyst 29.

Tan delta vs Mw for resins produced from catalyst 26 where the catalyst activation temperature was varied from 593 to 760°c. It clearly shows an increase in elasticity as the activation temperature is increased.

Tan delta vs Mw from catalysts with varying amounts of Na. Polymer was solvent treated.

Tan delta vs Mw from catalysts with varying amounts of Na. Polymer was solvent treated.

Effect of catalyst chromium content on tan delta of the resin.

Effect of catalyst chromium content on shear response.

Tan deltas for some resins produced from catalyst 25 are plotted together showing that high reaction temperature increases tan delta significantly.

Pore volume vs surface area for (1) catalysts which gave LCB, (2) catalysts which did not give LCB, and (3) catalyst 29 with varied activation temperatures.

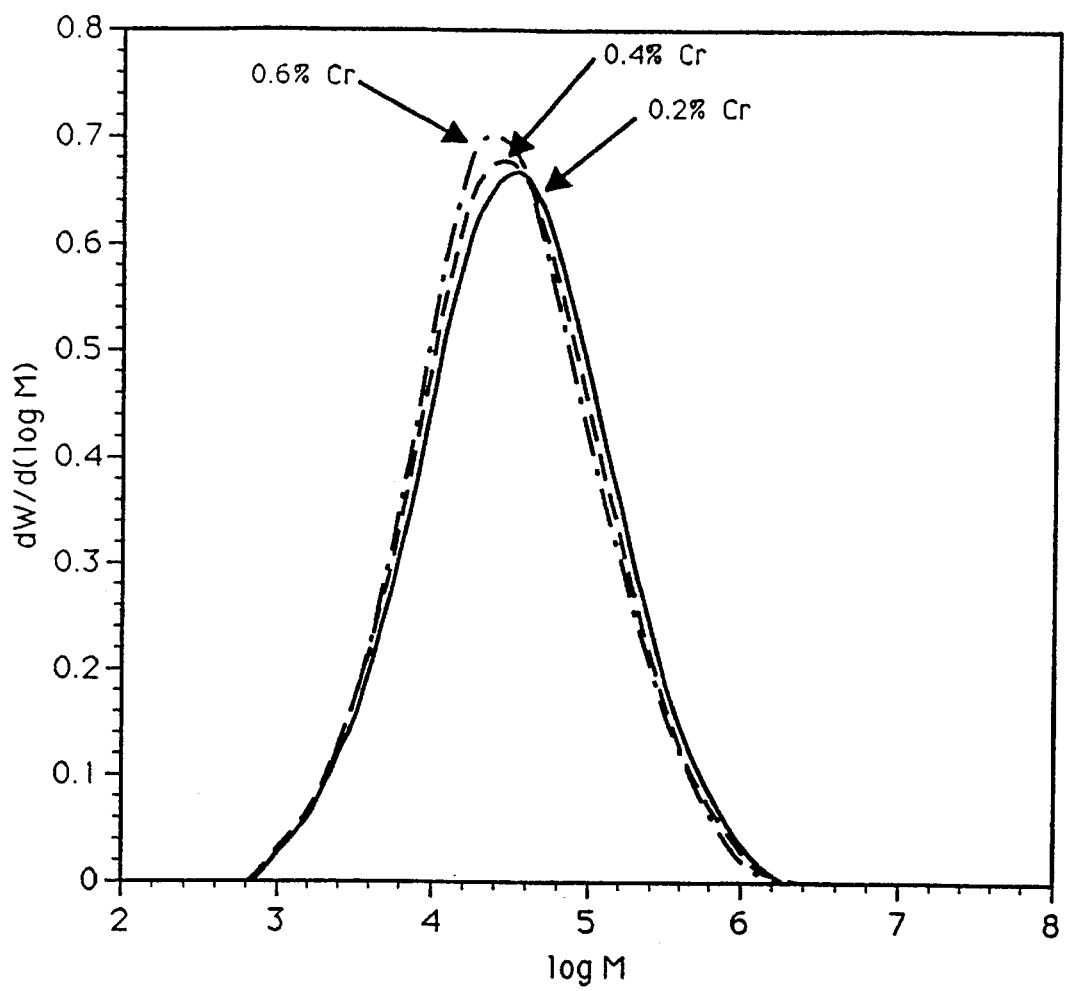
Figure 14. As the $Cr^{+6}$ concentration is increased from 0.2 to 0.6 wt% on 1500°F A, the molecular weight distribution shifts to lower molecular weight.

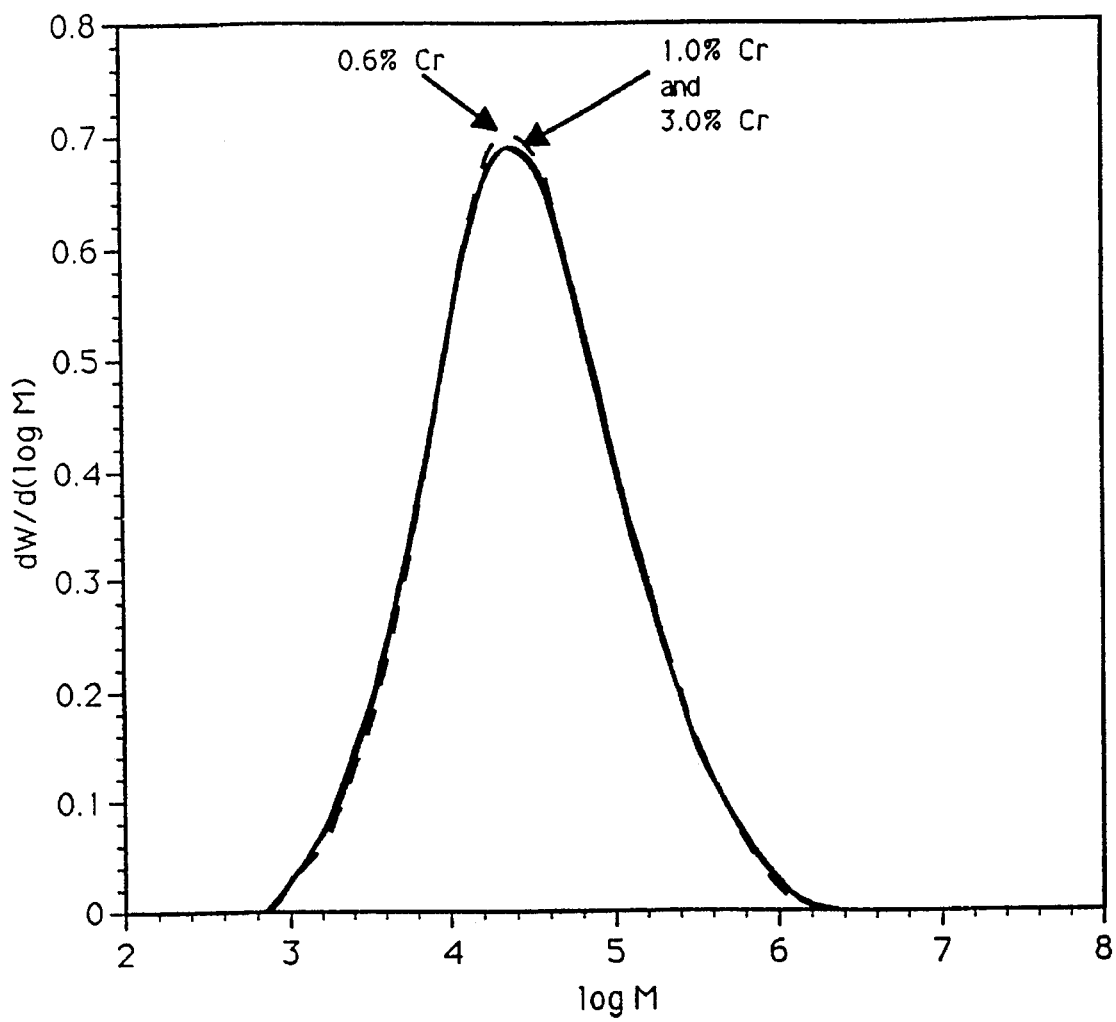
Figure 15. Increasing the $Cr^{+6}$ concentration on 1500°F A from 0.6 to 3.0 wt% has no effect on molecular weight distribution.

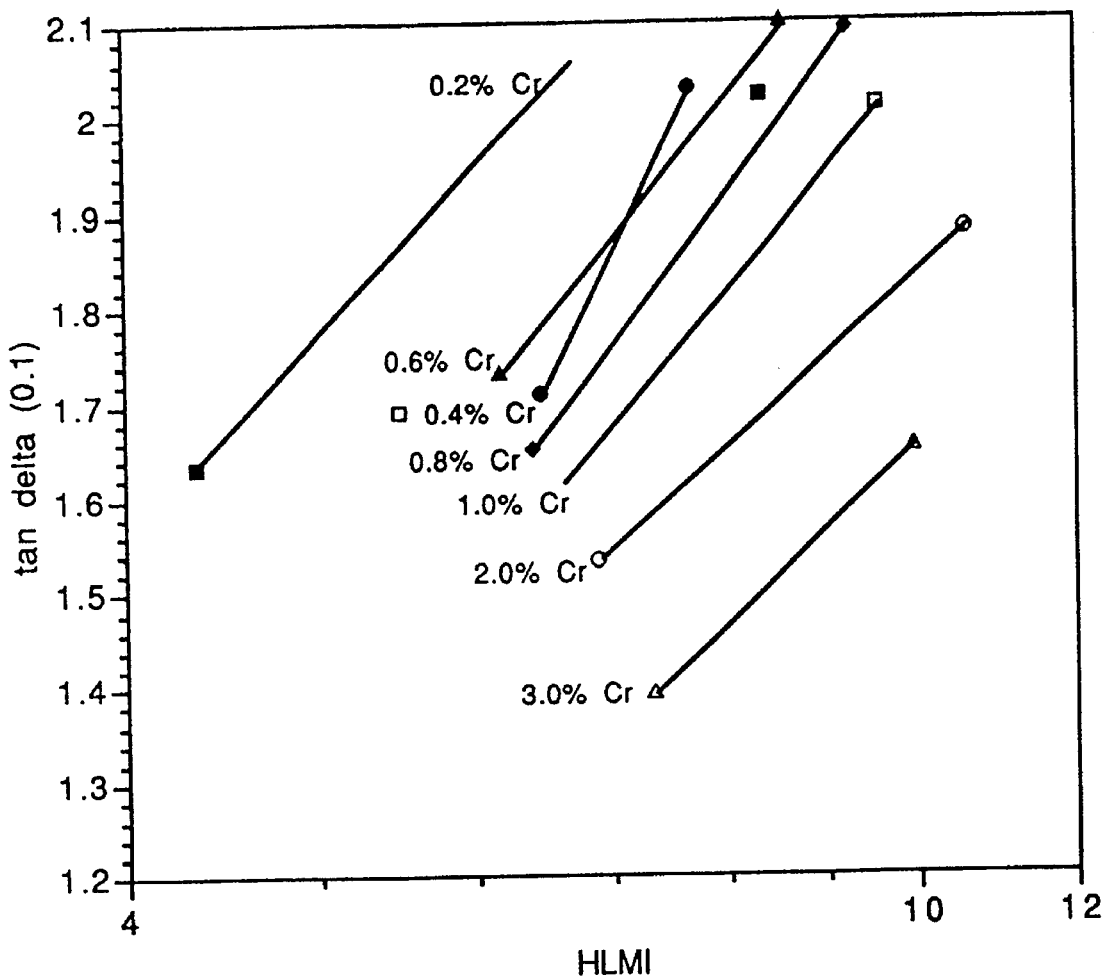
Figure 16. As the amount of $Cr^{+6}$ on 1100°F A is increased, tan delta decreases. There is no apparent saturation level.

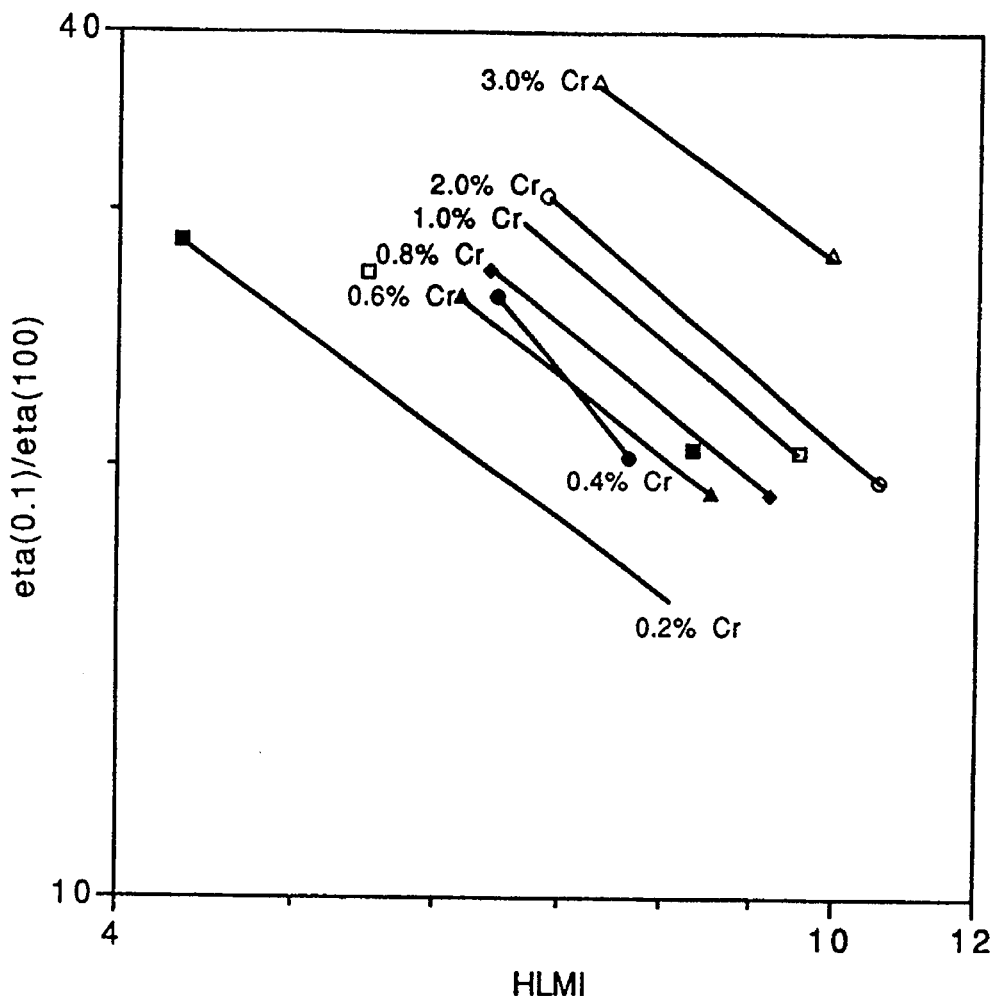
Figure 17. As the amount of $Cr^{+6}$ on 1100°F A is increased, shear response ($eta_{0.1}/eta_{100}$) increases. There is no apparent saturation level.

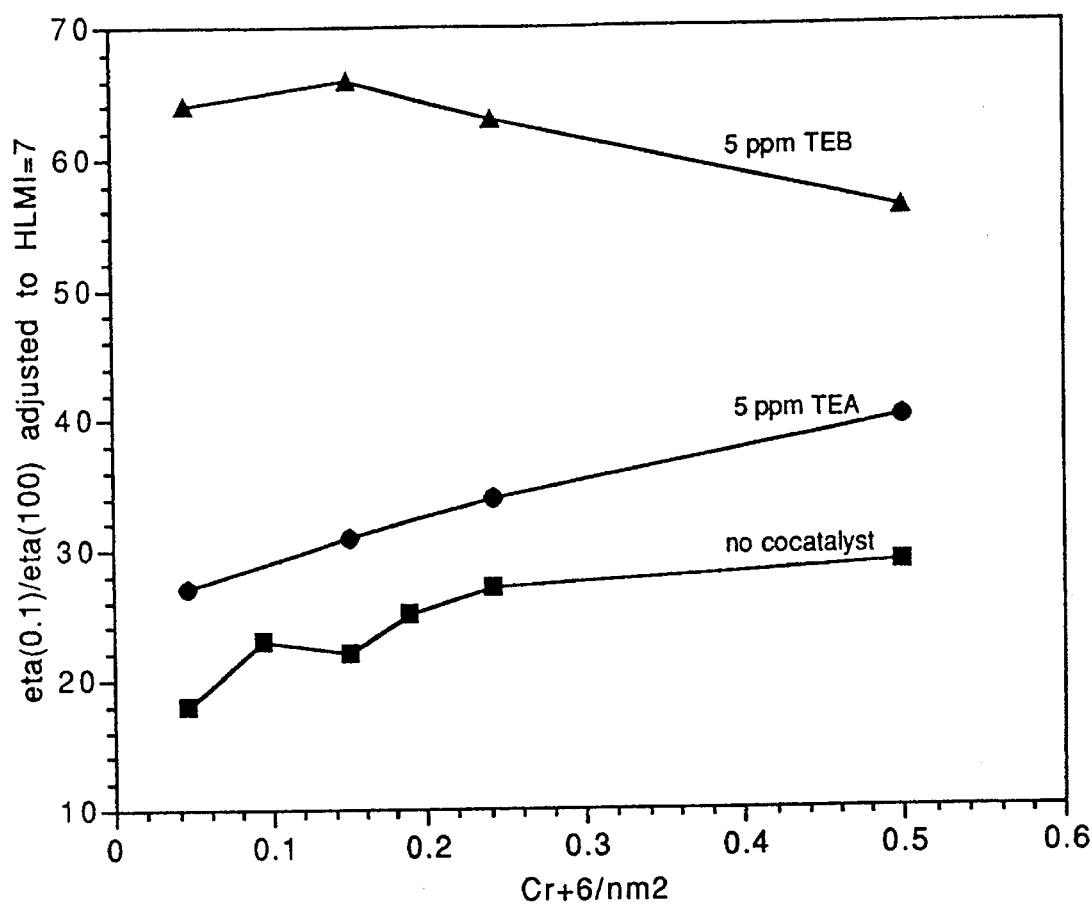
Figure 18. Effect of TEA and TEB on the shear response of resins made with 1100°F A.

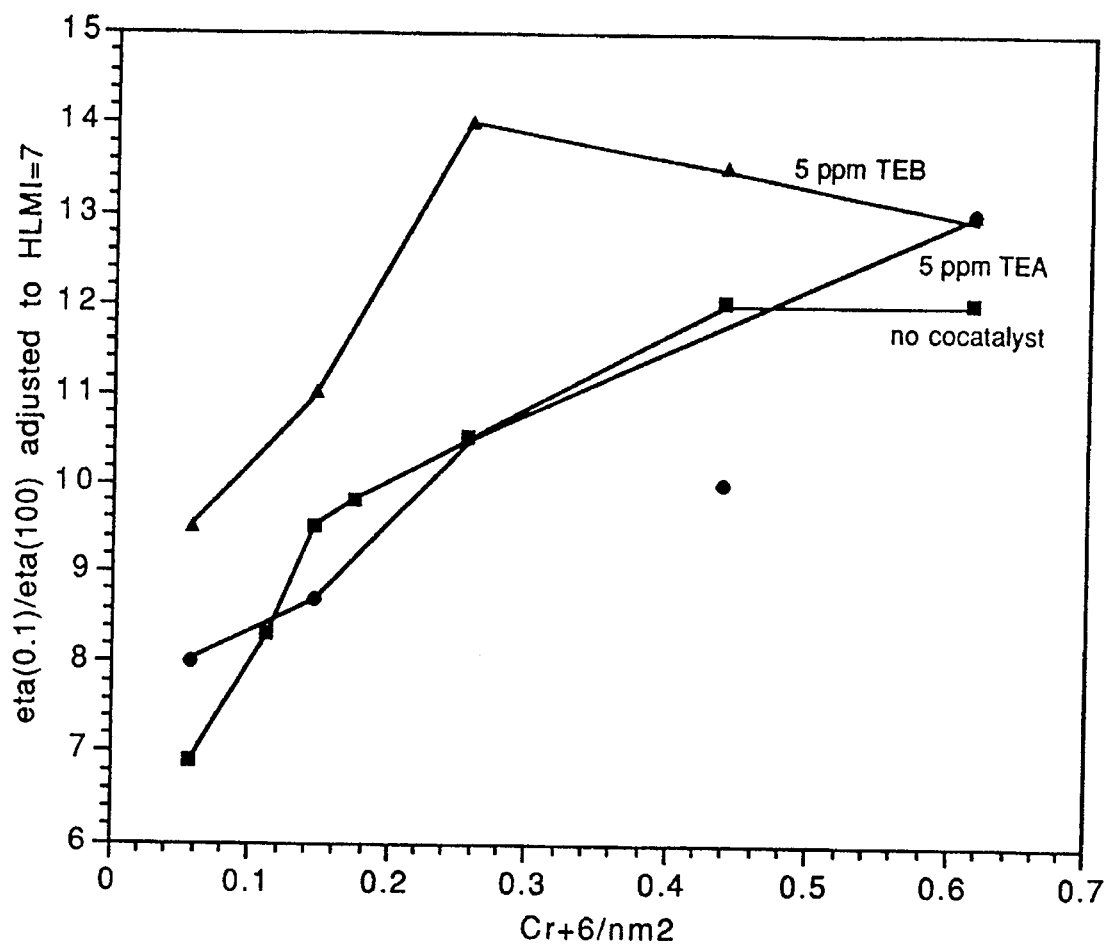
Figure 19. Effect of TEA and TEB on the shear response of resins made with 1500°F A.

1

CHROMIUM CATALYST COMPOSITIONS AND ETHYLENE POLYMERIZATION PROCESSES THEREWITH

This application is a Division of application Ser. No. 08/174,938, filed Dec. 28, 1993, now pending.

BACKGROUND OF THE INVENTION

This invention is related to the field of chromium catalyst compositions. This invention is also related to the field of ethylene polymerization processes catalyzed with chromium catalyst compositions.

The terms "ethylene polymer", "ethylene polymers" and "polyethylene" for the purposes of this application shall mean homopolymer(s) comprising ethylene and/or copolymer(s) comprising a major amount of ethylene ($\geq 50$ mole percent) and a minor amount of comonomer (<50 mole percent).

It has long been recognized that the processability of an ethylene polymer is significantly affected by the amount of long chain branching in its molecular structure. This is because long chain branches give an ethylene polymer (when compared to ethylene polymers not having long chain branches) a high viscosity under low shear conditions and a low viscosity under high shear conditions. Having a low viscosity under high shear conditions can increase the rate at which the ethylene polymer can be processed, thereby making the process more efficient. Furthermore, long chain branching is known to reduce die swell during blowmolding operations and increase bubble stability during film blowing operations. Since long chain branching has such a large affect on the rheological properties, it would be advantageous to be able to control the amount of long chain branching in an ethylene polymer.

Ethylene polymers produced using chromium catalyst compositions have very low levels of long chain branching. However, even at these low levels, long chain branching has a significant affect on the rheological properties of an ethylene polymer. Therefore, it would be advantageous to be able to control the amount of long chain branching in an ethylene polymer that is produced by a chromium catalyst composition.

SUMMARY OF THE INVENTION

It is an object of this invention to provide a chromium catalyst composition.

It is another object of this invention to provide a chromium catalyst composition that is useful for homopolymerizing ethylene, or copolymerizing ethylene with a comonomer, to produce a ethylene polymer that has an increased amount of long chain branching and a decreased amount of die swell.

It is another object of this invention to provide a process to use this chromium catalyst composition to produce an ethylene polymer that has an increased amount of long chain branching and a decreased amount of die swell.

In accordance with this invention a chromium catalyst composition is provided that comprises

[a] a support that comprises silica, wherein said support has a surface area to pore volume relationship as follows $0.5 \leq$ Pore volume $\leq$ function of surface area (hereafter f(SA))

wherein said f(SA) is $(1.14 \times 10^{-7})(SA)^{-3} - (1.19 \times 10^{-4})(SA)^2 + (3.19 \times 10^{-2})(SA) + 0.20;$ and

[b] a hexavalent chromium compound;

wherein the surface concentration of said hexavalent chromium on said support is from about 0.25 to about 1 hexavalent chromium atoms per square nanometer.

In accordance with another embodiment of this invention a process to homopolymerize ethylene, or copolymerize ethylene with a comonomer, is provided, said process comprises polymerizing ethylene with the above chromium catalyst composition.

These and other objects, features, aspects, and advantages of the invention will become better understood with reference to the following figures, descriptions, and claims.

BRIEF DESCRIPTION OF THE FIGURES

The following is a brief description of the figures.

FIG. 14 is a graph of the molecular weight distribution for ethylene polymers produced with catalysts that have various levels of chromium.

FIG. 15 is a graph of the molecular weight distribution for ethylene polymers produced with catalysts that have various levels of chromium.

FIG. 16 is a graph of the tan delta vs. the high load melt index for ethylene polymers produced with catalyst A.

FIG. 17 is a graph of the eta ratio vs. the high load melt index for ethylene polymers produced with catalyst A.

FIG. 18 is a graph of the eta ratio vs. the surface concentration of hexavalent chromium for ethylene polymers produced with catalyst A.

FIG. 19 is a graph of the eta ratio vs. the surface concentration of hexavalent chromium for ethylene polymers produced with catalyst A.

DETAILED DESCRIPTION OF THE INVENTION

Figure 1:
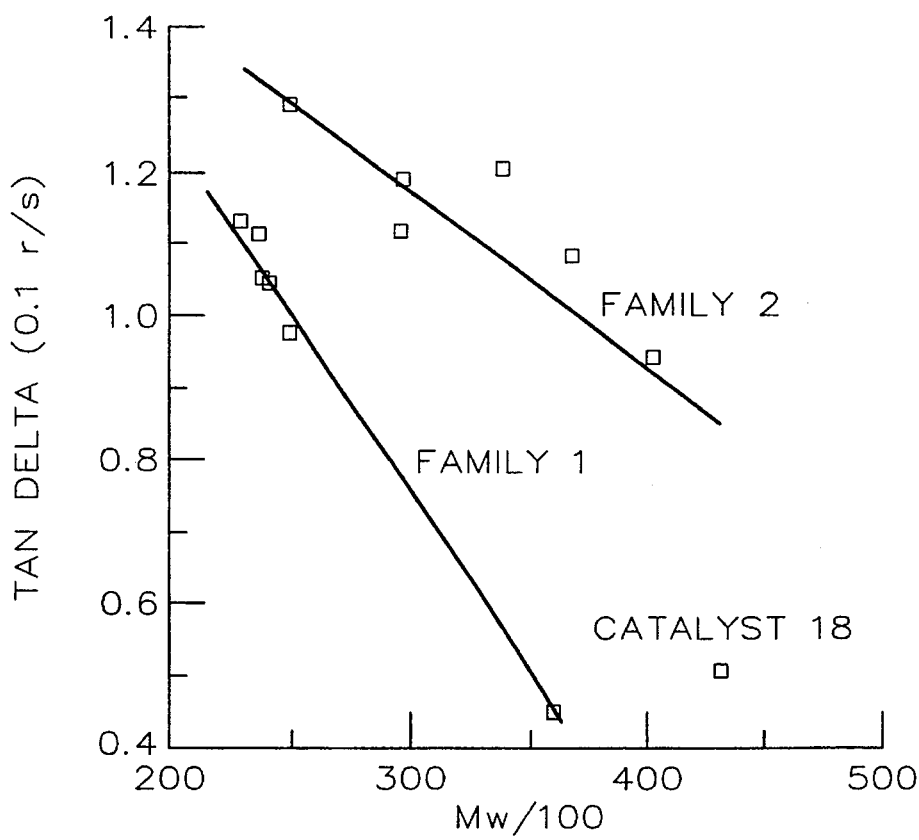
FIG. 1 is a graph of the tan delta vs. the weight average molecular weight for ethylene polymers produced from chromium/silica catalysts.

In general, the chromium catalyst compositions used in this invention comprise a chromium component and a support component. The support component is not meant to be construed as an inert component of the chromium catalyst composition.

The support is generally composed of about 80 to about 100 wt. % silica. The remainder, if any, being selected from the group consisting of refractory metal oxides, such as aluminum, boria, magnesia, thoria, zirconia, titania, and mixtures of two or more of these refractory metal oxides. It is preferred however, that the remainder, if any, consists essentially of titania. The support can be prepared in accordance with ally method known in the art. Suitable methods are disclosed in U.S. Pat. Nos. 3,900,457; 4,081,407; 4,392,990; 4,405,501; 4,735,931; and 4,981,831; the entire disclosures of which are hereby incorporated by reference.

It is important that the support have a surface area to pore volume relationship as follows:

$$0.5 \leq \text{pore volume} \leq f(SA)$$

wherein the f(SA) is $(1.14 \times 10^{-7})(SA)^3 - (1.19 \times 10^{-4})(SA)^2 + (3.19 \times 10^{-2})(SA) + 0.20$.

It is preferred if the surface area of the support is from about 50 m²/g to about 500 m²/g. It is more preferred if the surface area if from 100 m²/g to 300 m²/g. If the surface area is substantially greater than 500 m²/g then the polymer produced by this catalyst will not possess the desired amount of long chain branching. If the surface area is substantially less than 50 m²/g then the support cannot carry enough hexavalent chromium to form a high activity catalyst composition. It is also preferred if the pore volume is from about 0.5 to about 2.5 cc/g. However, it is more preferred if the pore volume is from 1 to 2 cc/g. If the pore volume is substantially greater than 2.5 cc/g then the polymer produced by this catalyst composition will not possess the desired amount of long chain branching. If the pore volume is substantially less than 0.5 cc/g thou the catalyst composition will have low activity.

One method to affect the surface area of the support is by contacting the support with aqueous ammonia. The aqueous ammonia should have a pH greater than about 7. However, it is preferred if the aqueous ammonia has a pH from about 8 to about 11. The support can be contacted with the aqueous ammonia for a time period in the range of about 1 minute to about 100 hours. However, depending on the desired surface area longer contact times tend to produce smaller surface areas.

The chromium component of the chromium catalyst composition comprises a chromium compound. Suitable chromium compounds are chromium nitrate, chromium acetate, and chromium trioxide. The amount of chromium compound combined with the support is from about 0.5 wt. % to about 5 wt. %, preferably it is from about 1 wt. % to about 4 wt. %, and most preferably it is 1 wt. % to 3 wt. % based on the combined weight of the chromium compound and the support. If the amount of chromium is substantially greater than 5 wt. % then the activity of the catalyst composition is undesirably low and the resulting polymer has an unacceptable color. If the amount of chromium is substantially less than 0.5 wt. % then the activity of the catalyst composition is undesirably low and the resulting polymer does not have the desired amount of long chain branching. The chromium compound can be combined with the support in any manner known in the art. Examples of combining the chromium compound with the support are disclosed in the above-cited and incorporated patents.

It is important that the valence state of the chromium in the chromium compound be six. In other words, hexavalent chromium is the preferred catalytic species. The surface concentration of the hexavalent chromium on the support must be from about 0.25 to about 1 hexavalent chromium atoms per square nanometer. It is preferred however, if the surface concentration of hexavalent chromium is from 0.4 to 1 hexavalent chromium atom per square nanometer.

A Group I metal can be contacted with the chromium catalyst composition to further increase the amount of long chain branching in a resulting polymer. The amount of the Group I metal to contact with chromium catalyst composition is from about 1 to about 5000 parts per million by weight based on the weight of the chromium catalyst composition. However, it is preferred, if the amount of the Group I metal is from 100 to 3000 parts per million. Sodium and potassium are the preferred Group I metals to use in this regard.

The chromium catalyst composition can be activated in a variety of ways. In general, activation occurs when the chromium compound is contacted with an oxygen-containing ambient. This contacting should take place at a temperature from about 500° C. to about 1000° C. However, the proper temperature range depends on the composition that is to be activated and how that composition will be used.

For example, if the chromium catalyst composition is going to be used without a cocatalyst then the chromium catalyst composition should be activated at a temperature from about 750° C. to about 1000° C. However, it is preferred if the chromium catalyst composition in this case is activated at a temperature from about 800° C. to about 1000° C. However, it is even more preferred if the chromium catalyst composition is activated at a temperature from 800° C. to 925° C. If the chromium catalyst composition is going to be used with a cocatalyst, a lower activation temperature can be used. In this case, the chromium catalyst composition can be activated at a temperature from about 500° C. to about 700° C. However, it is preferred if the chromium catalyst composition, in this case, is activated at a temperature from 600° C. to 700° C.

After this activation, the chromium catalyst composition can be used to homopolymerize ethylene, or copolymerize ethylene with a comonomer. A preferred polymerization technique is a slurry polymerization process also known as the particle form process. Such polymerization techniques are well known in the art and are disclosed, for instance, in Norwood, U.S. Pat. No. 3,248,179; the entire disclosure of which is hereby incorporated by reference. Two preferred polymerization methods for the slurry process are those employing a loop reactor of the type disclosed in Norwood and those utilized in a plurality of stirred reactors either in series, parallel, or combinations thereof, wherein the reaction conditions are different in the different reactors. It is possible to copolymerize ethylene with a comonomer during the polymerization. The comonomers that can be copolymerized with ethylene should have from three to about 20 carbon atoms in their molecular chain. They can be either linear or branched, but linear comonomers are preferred. Suitable examples of comonomers are propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures of two or more said comonomers.

In the polymerization process of this invention a trialkylaluminum cocatalyst can be present during the polymerization. In general, the alkyl groups of the trialkylaluminum cocatalyst should have from about 1 to about 10 carbon atoms and preferably 2 to 4 carbon atoms. Examples, include but are not limited to, triethylaluminum, tripropylaluminum, and trimethylaluminum. However, most preferred is triethylaluminum. The amount of trialkylaluminum cocatalyst used in the polymerization, in parts per million by weight, based on the weight of the diluent in the reactor, is from about 0.01 parts per million to about 20 parts per million, preferably it is from about 0.05 parts per million to about 10 parts per million and most preferably it is from 0.5 to 5 parts per million.

If a trialkylaluminum cocatalyst is not present during the polymerization, a trialkylboron compound should be present. In general, the alkyl groups of the trialkylboron cocatalyst should have from about 1 to about 10 carbon atoms and preferably 2 to 4 carbon atoms. Examples include, but are not limited to, triethylboron, tripropylboron, and trimethylboron. However, most preferred is triethylboron. The amount of trialkylboron cocatalyst used in a polymerization, stated in parts per million by weight, based on the weight of the diluent in the reactor, is from about 0.01 parts per million to about 20 parts per million. Preferably it is from about 0.05 parts per million to about 10 parts per million, and most preferably it is from 0.5 parts per million to 5 parts per million.

It is important to this invention that the polymerization temperature should be from about 80° C. to about 110° C. However, it is preferred if the reaction polymerization temperature is from 95° C. to 105° C. If the temperature is substantially greater than 100° C. the reactor can foul and the resulting polymer will not possess the desired amount of long chain branching. If the temperature is substantially less than 80° C. the catalyst activity is too low and the resulting polymer has a melt index which is undesirably low.

EXAMPLES

These examples are provided to further assist a person skilled in the art with understanding this invention. The particular reactants, conditions and the like, are intended to be generally illustrative of this invention and are not meant to be construed as unduly limiting the reasonable scope of the invention.

EXAMPLE ONE

Catalysts

The catalysts used in the initial portion of this example are listed in Table 1. All were prepared with 1% chromium and activated at 750° C., in order to determine the relationship of catalyst pore structure to long chain branching. These catalysts consist of commercial polyolefin catalysts, chromatographic silicas, colloidal silicas, and others. Some of the catalysts have low activity, but this selection provides a wide range of pore structures, allowing the pore volume, surface area, and pore size to be studied.

For analysts purposes, these catalysts were divided into three groups, according to the composition of the support.

Group 1 (Catalysts 1–19, and 29): This group consists of catalysts that have silica as their support. It could be broken down further by analyzing catalysts 4–9 separately from the other silica-based catalysts because of their different nature. Catalysts 4–9 are colloidal sized silica particles, and they were prepared as catalysts by two methods in order to vary the degree of particle aggregation. In preparation method A, chromium was deposited on the silica from a methanolic solution. During methanol removal, considerable particle aggregation occurred due to the surface tension of the evaporating methanol. This is shown by the high pore volume (Table 2) since individual nonporous particles should have no pore volume. In preparation method D, catalysts 5, 7, and 9 were reacted with chromyl chloride vapor. Some particle aggregation still occurred because of the high activation temperature, but it was reduced as shown by the lower pore volume (Table 2).

Group II (Catalyst 20): Is a catalyst in which the pores have been filled with aluminum phosphate. We have no other catalysts of this type, so it was compared with other catalysts which gave similar molecular weights.

Group III (Catalysts 21–26): Silica/titania was used as the catalyst support with titanium levels of 2–5%.

The pore structure properties were determined from the nitrogen adsorption and desorption isotherms for all catalysts used in this example and the results are listed in Table 2. The average pore radius was calculated from the pore volume and surface area according to equation 1.

$$\text{Average Pore Radius (in ``Angstroms'')} = (2 \times \text{Pore Volume in (cc/g)} / \text{Surface Area in (m}^2\text{/g)}) \times 10^4 \quad (1)$$

Catalysts Giving Long Chain Branching

All polymerizations were carried out under the same conditions using 2 ppm of TEA as a poison scavenger due to problems with the isobutane supply. The activities of the various catalysts are shown in Table 3.

The resulting polymers were analyzed for long chain branching by comparing the melt rheology (Table 4) and size exclusion chromatography (SEC) data (Table 5) to determine if the resin has higher elasticity than can be justified by the molecular weight. For samples where the viscosity was too high to obtain the SEC, $M_w$ was estimated from $M_y$. This was done by assuming that $M_w/M_y=1.4$ since all polymers for which the SEC was obtained had $M_w/M_y=1.31-1.54$.

Our conclusions on which catalysts gave higher levels of long chain branching are summarized in Table 6. The basis for these conclusions are given in the following paragraphs.

a. Silica Catalysts

Figure 2:
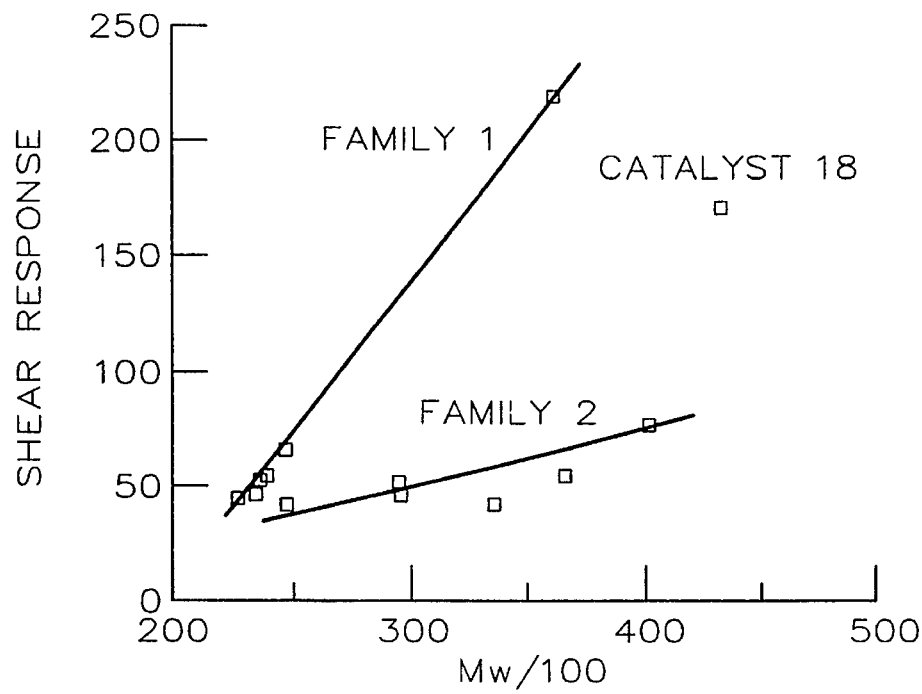
FIG. 2 is a graph of the shear response vs. the weight average molecular weight for ethylene polymers produced from chromium/silica catalysts.

In order to simplify the analysis of silica catalysts for long chain branch formation, the polymers produced from catalysts 4–9 were initially omitted. The rheology of the polyethylene from the remaining catalysts shows two distinct families. Family 1 (consisting of polymers produced from catalysts 29C, 7, 3, 10, and 19) has a lower tan delta (FIG. 1) and higher shear response (FIG. 2) showing that these polymers have greater elasticity. Their rheological properties also have a greater dependence on molecular weight than family 2 as shown by the sharper slopes in FIGS. 1 and 2. With the exception of the polymer produced from catalyst 19, family 1 polymers have narrow MWD's (Table 5), which is normally associated with low shear response. Therefore, the greater shear response and elasticity of this group must be due to long chain branching.

The $M_w$ of the polymer produced from catalyst 18 was estimated from the $M_v$ to be 431,000. This places it between family 1 and family 2 in FIGS. 1 and 2. This could be due to the presence of some long chain branching or to a very broad MWD. Without the SEC it is difficult to say which.

Figure 3:
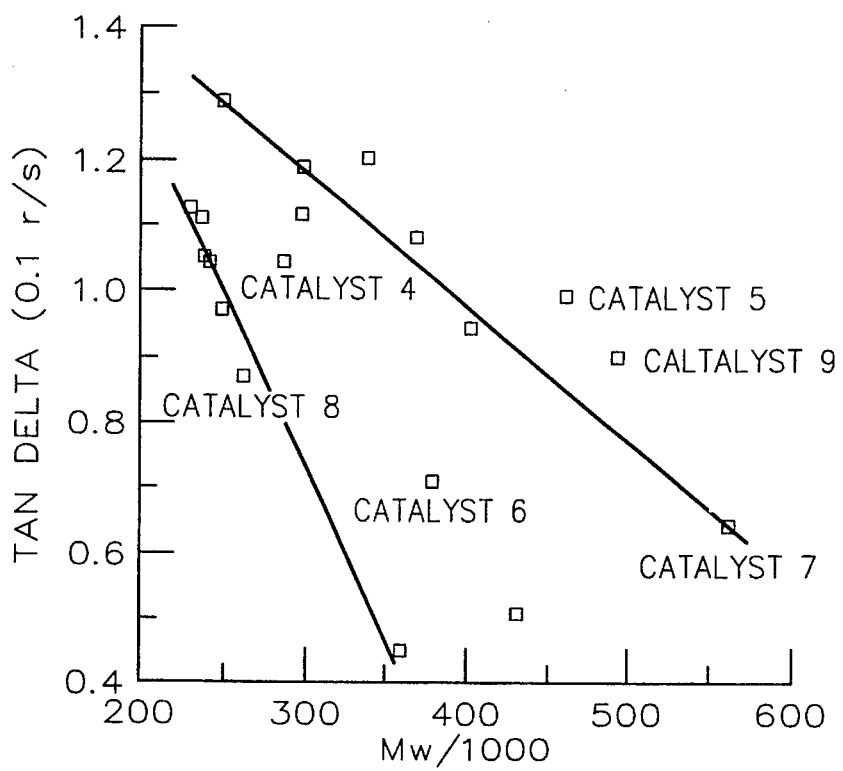
FIG. 3 is a graph of the tan delta vs. the weight average molecular weight for ethylene polymers produced from chromium/silica catalysts.

When the polymers produced from catalysts 4–9 are added, the separation into groups is not as clear (FIG. 3). The polymer produced from catalyst 8 lies directly in line with family 1, suggesting that it has long chain branching. The polymers from catalysts 4 and 6 fall between the two families, but this is probably due to their broad MWDs. The polymers produced from catalysts 5, 7, and 9 are in family 2 with no long chain branching.

b. Silica-titania Catalysts

Figure 4:
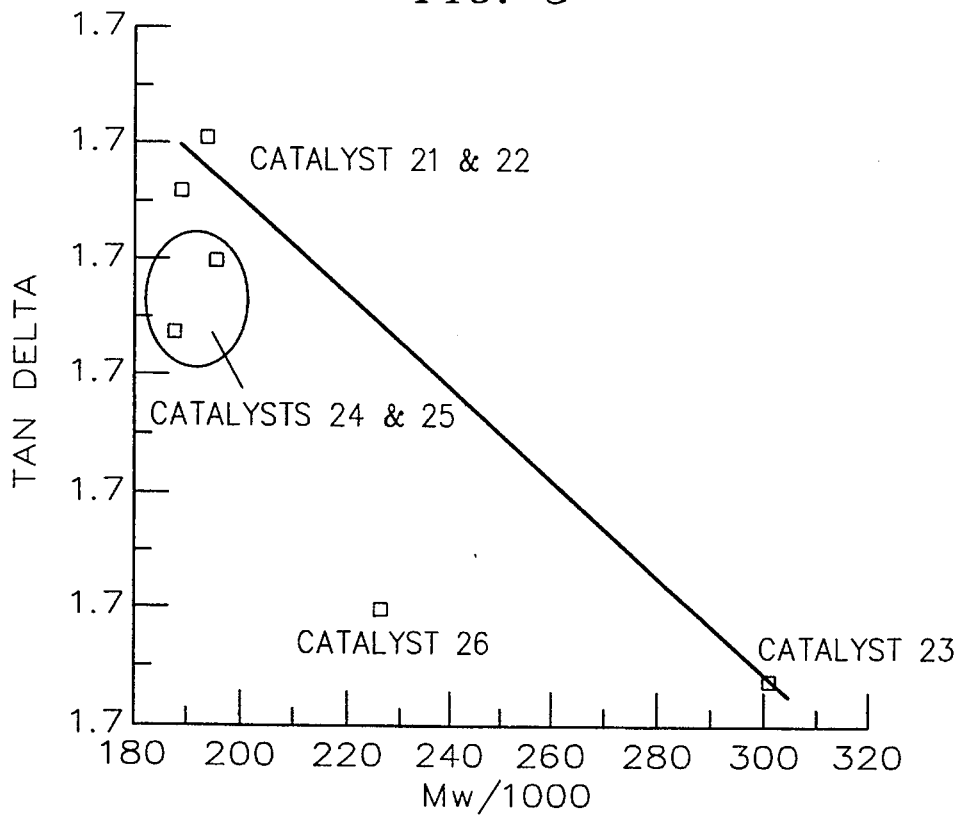
FIG. 4 is a graph of the tan delta vs. the weight average molecular weight for ethylene polymers produced from chromium/silica-titania catalysts.
Figure 5:
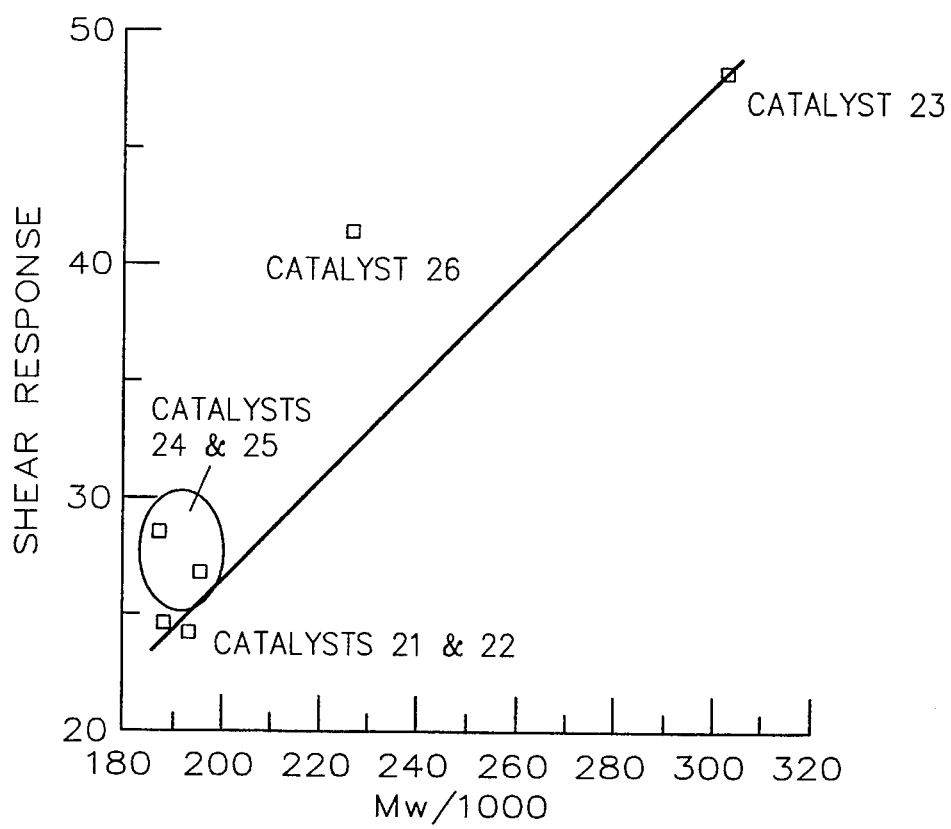
FIG. 5 is a graph of the shear response vs. the weight average molecular weight for ethylene polymers produced from chromium/silica-titania catalysts.

The theology results for the titania containing catalysts are shown in FIGS. 4 and 5. There are two noticeable trends here. (1) The polymers produced from catalysts 24 and 25 have higher elasticity than the polymer produced from catalysts 21 and 22, even though their $M_w$ is about the same. But they have very broad MWD's which account for this increased elasticity. (2) Even though the polymer produced from catalyst 26 has a much lower $M_w$ than the polymer produced from catalyst 23, its elasticity is approximately the same. The HI difference is not enough to account for this, so the resin produced from catalyst 26 must have long chain branching which Is contributing to its elasticity.

c. Catalyst 20

We have no other catalysts with the same support composition as catalyst 20. Therefore, the polymer produced from catalyst 20 was compared to those from 14, 17, and 23 since they have similar molecular weights. The HI of the polymer (Table 5) is comparable to that of the polymers produced from catalysts 14 and 23, and much lower than that of the polymer produced from catalyst 17. But still the polymer produced from catalyst 20 possesses a much lower tan delta and higher shear response. This high elasticity must be due to long chain branching.

Other Parameters Affecting Long Chain Branching a. Effect of Activation Temperature Catalyst 29 was activated at different temperatures to determine if catalyst activation temperature has any effect on long chain branching. As the activation temperature was increased, the catalyst pore volume and surface area decreased while the average pore radius remained about the same (Table 7). This change in pore structure was minor below 750° C., but it became rapid at higher temperatures.

Figure 6:
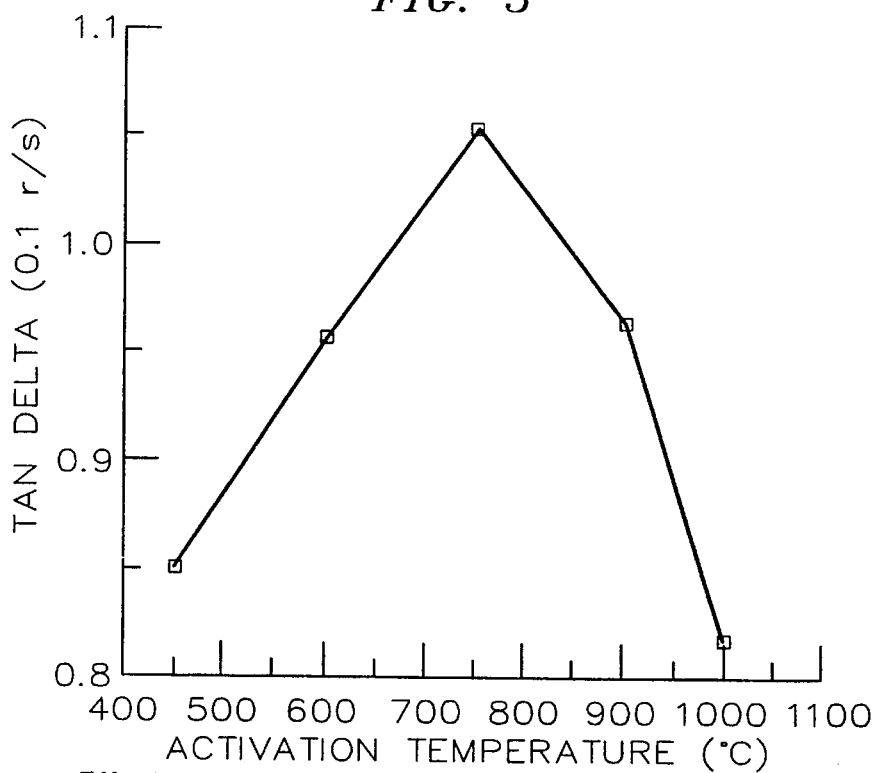
FIG. 6 is a graph of the tan delta vs. the activation temperature for ethylene polymers produced from catalyst 29.

The intrinsic viscosities in Table 8 show that the molecular weight of polyethylene decreases as the catalyst activation temperature is increased. Thus, the elasticity of these samples should also decrease as the activation temperature is increased. An increase in tan delta in FIG. 6 shows that the elasticity is decreasing as expected when the temperature is increased from 450° C. to 750° C. However, above 750° C. activation, the elasticity begins to increase. This could be due to either a broadening of the molecular weight distribution or to long chain branching. Table 8 shows that the molecular weight distribution is narrow at high activation temperatures (HI=7.1 for 1000° C. activation). Therefore, we must conclude that the increase in elasticity on increasing the activation temperature is due to increasing amounts of long chain branching.

The trend in FIG. 6 shows that long chain branching increases with activation temperature above 750° C., but it is likely that this effect also applies at lower temperatures. This plot results from two variables, decreasing molecular weight and increasing long chain branching. There is a sharp decrease in molecular weight on increasing the activation temperature from 450° C. to 750° C. This molecular weight change hides any increase in elasticity which could be due to long chain branching. Above 750° C., the molecular weight decrease begins to level off allowing the long chain branching effect to become apparent.

Figure 7:
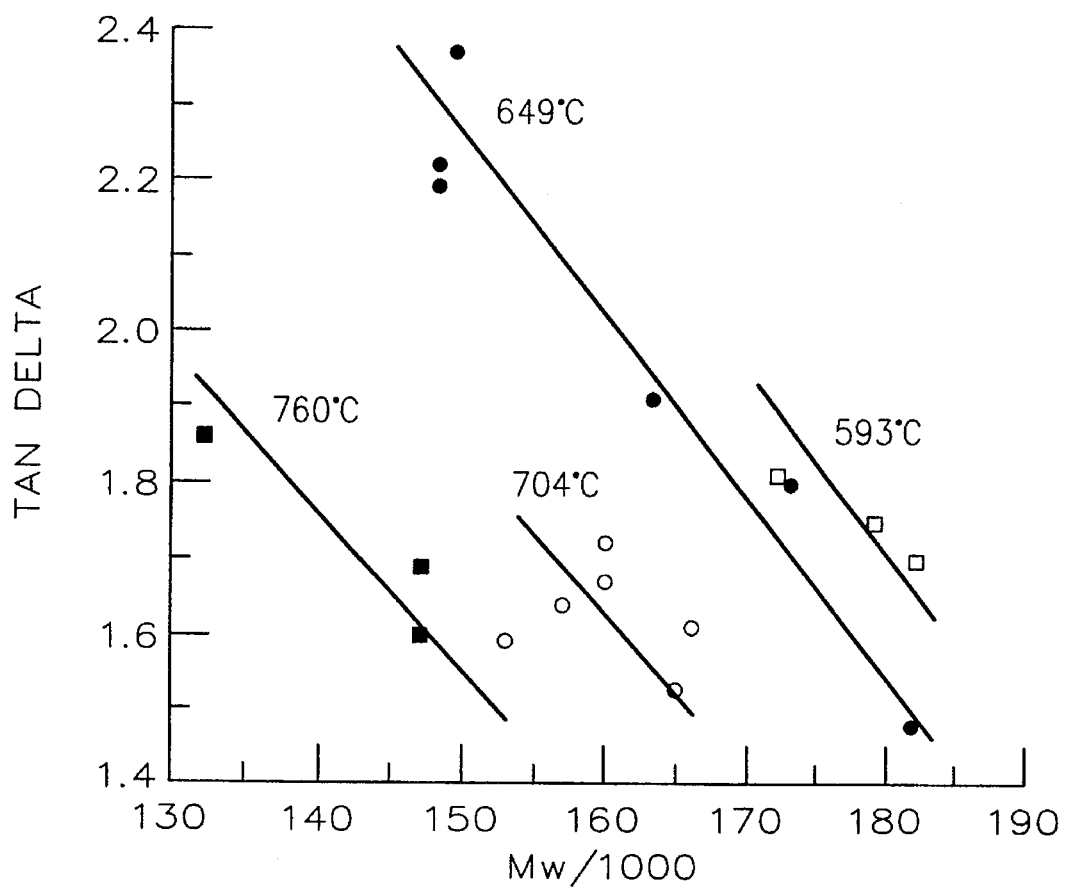
FIG. 7 is a graph of the tan delta vs. the weight average molecular weight for ethylene polymers produced from catalyst 26.

This becomes more apparent in FIG. 7 which shows tan delta vs $M_w$ for a series of resins produced from catalyst 26 (activated at different temperatures). It shows that tan delta increases (or long chain branching decreases) with decreasing activation temperature down to a temperature of at least 593° C.

b. Sodium Effect

In order to look at the effect of Na, the catalysts in Table 9 were prepared. Catalysts 32 and 35 were prepared by hydrolysis of tetraethyl orthosilicate, so they have very low Na contents. Each was run with different levels of added sodium.

The effect of Na and Ti on the catalyst pore size distribution is shown in Table 9. As expected, when the Na level increases, pore volume and surface area decrease in much the same way as when the activation temperature is increased. This is due to a lowering of the catalyst sintering temperature.

Figure 8:
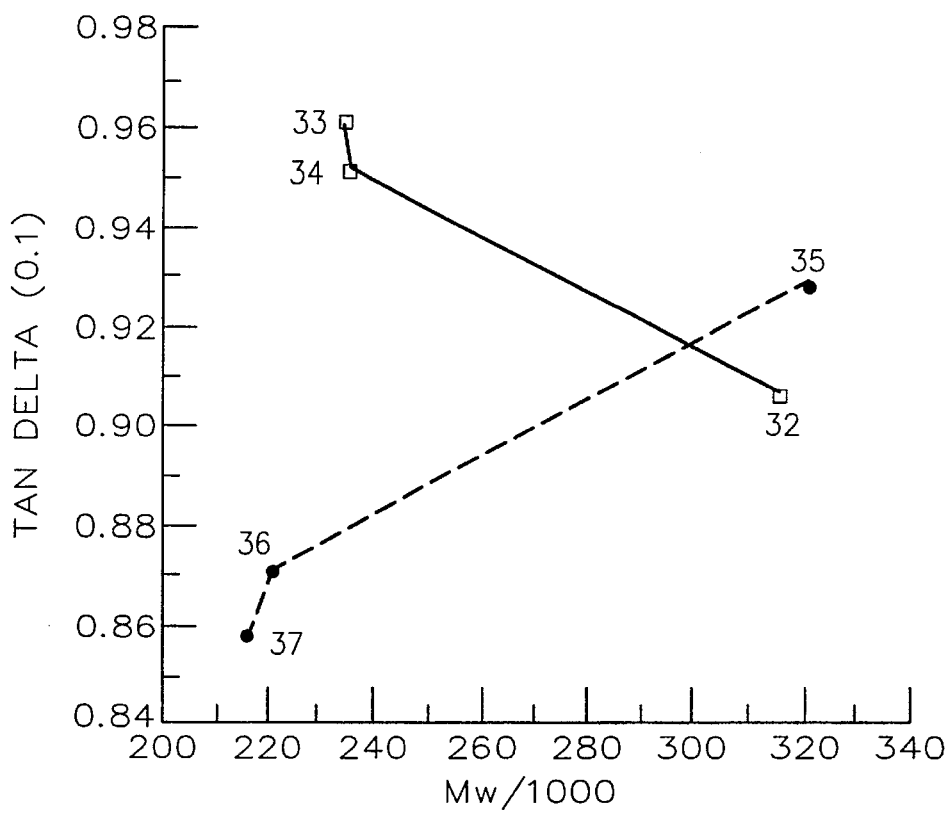
FIG. 8 is a graph of the tan delta vs. the weight average molecular weight for ethylene polymers produced with catalysts that have varying amounts of sodium.
Figure 9:
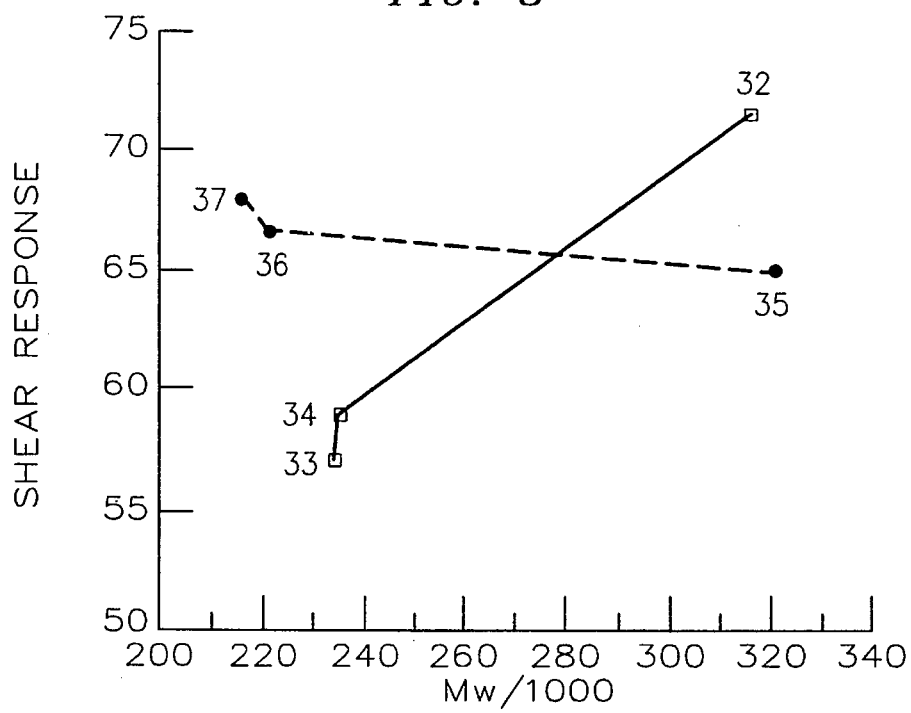
FIG. 9 is a graph of the shear response vs. the weight average molecular weight for ethylene polymers produced with catalysts that have varying amounts of sodium.

The rheology data for these polymers is given in Table 10. FIGS. 8 and 9 show plots with this data divided into two series. Catalysts 32–34 do not appear to give long chain branches even though 33 and 34 have high Na contents. In the series 35–37, catalyst 35 does not appear to give long chain branching, but when the Na content is increased in 36 and 37, tan delta decreases and shear response increases even though there is a large decrease in $M_w$. This suggests that 36 and 37 contain long chain branching. This shows that addition of sodium affects long chain branching in some cases, but not in all cases.

In order to look further at the effect of sodium on long chain branching, the sodium content of some of the catalysts in Table 1 were determined by plasma digestate analysis. The results are given in Table 11. They show that the sodium content does not have a direct effect on long chain branching, because there is a wide range of sodium contents in the catalysts which gave long chain branching (<53 to 2220 ppm Na) as well as in those that did not give long chain branching (<52 to 452 ppm Na).

c. Effect of Chromium Content

Figure 10:
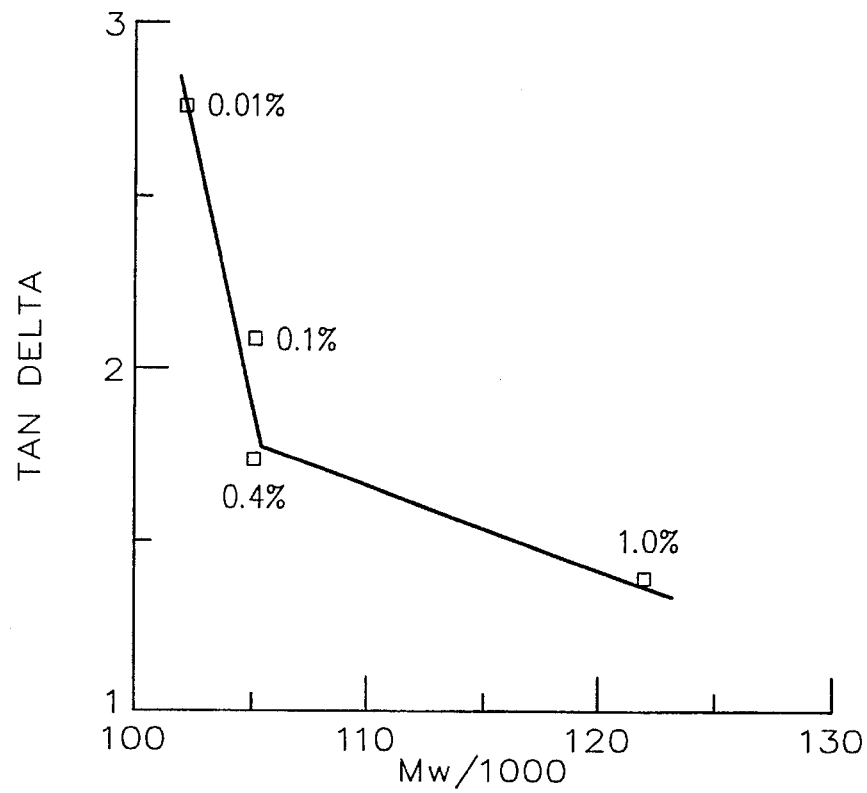
FIG. 10 is a graph of the tan delta vs. the weight average molecular weight for ethylene polymers produced with catalysts that have varying amounts of chromium.
Figure 11:
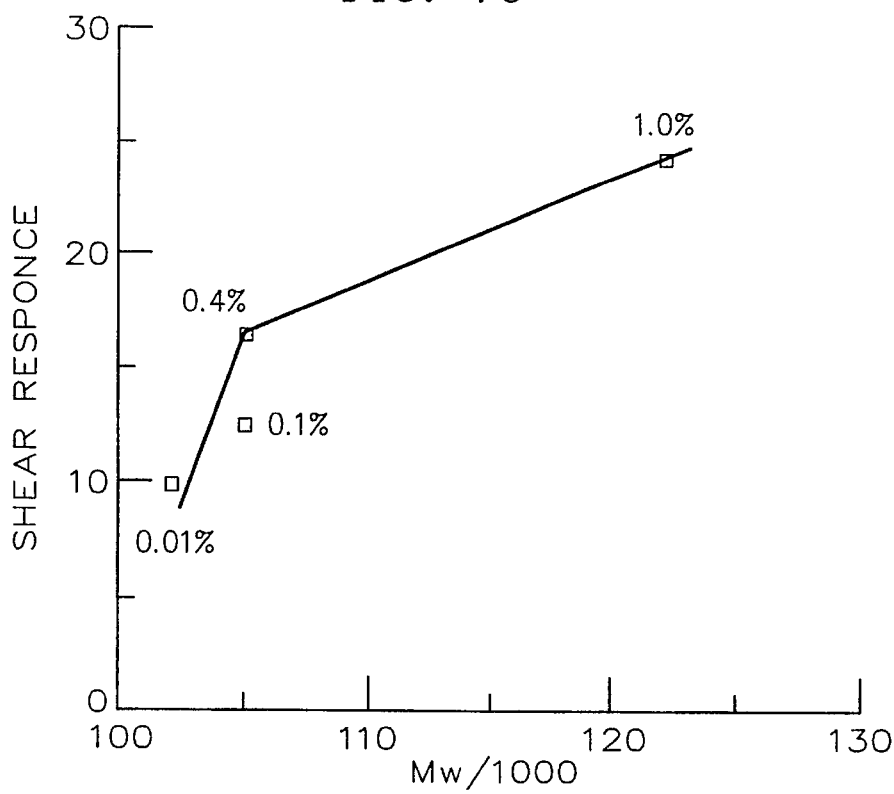
FIG. 11 is a graph of the shear response vs. the weight average molecular weight for ethylene polymers produced with catalysts that have varying amounts of chromium.

Polyethylene samples were obtained which had been produced with catalyst 38. Catalyst 38 contained various levels of chromium. The polymer properties are shown in Table 12. FIGS. 10 and 11 show that as the chromium content is increased up to 0.4%, the elasticity of the resin increases rapidly even though there are only slight increases in $M_w$ and HI. Above 0.4% Cr, $M_w$ increases much more rapidly but the elasticity appears to level off. This shows that long chain branching increases with chromium content up to 0.4% Cr, but then it reaches a saturation point where further increases in Cr have less of an effect.

d. Effect of Reaction Temperature

Figure 12:
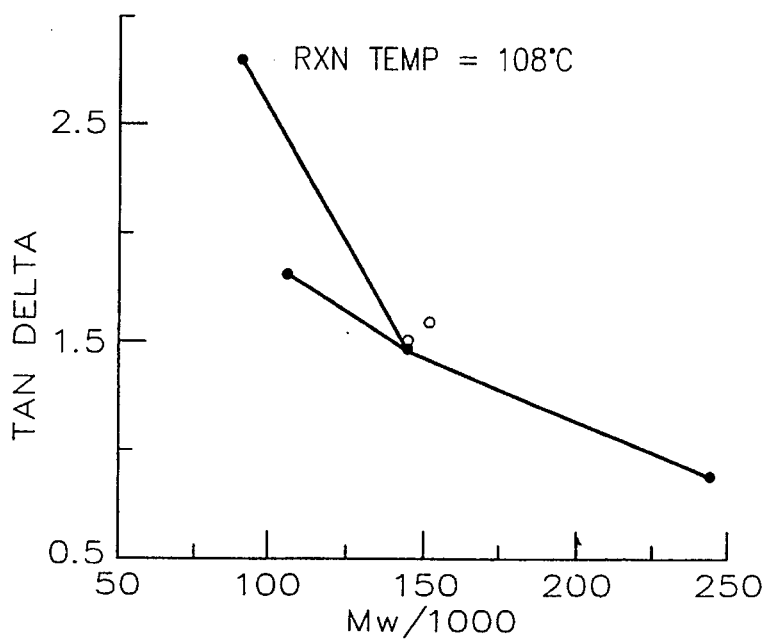
FIG. 12 is a graph of the tan delta vs. the weight average molecular weight for ethylene polymers produced with catalyst 25.

The catalyst 25A was run at various reaction temperatures to see if this affected the long chain branching (Table 13). As reaction temperature was increased, $M_w$ decreased and the molecular weight distribution narrowed. FIG. 12 shows that the polymer produced at 108° C. has much higher tan delta and crossover modulus than expected. This suggests that fewer long chain branches are formed at high reaction temperatures. The similarity of the calculated and measured inherent viscosities (Table 13) also suggest that the resin produced at 108° C. is behaving more like linear chains.

Initial Catalyst Preparations

The catalysts used in the initial portion of this example were prepared by one of the following methods as designated in Table 1.

Method A

The support was wetted with a solution of methanol containing enough chromium nitrate to give 1% Cr based on the weight of support. The methanol was removed by heating at 100° C. under vacuum.

Method B

Catalyst 14 was prepared as in Method A, except an aqueous solution of chromium nitrate was used. This gave a catalyst with lower pore volume than catalyst 13 (the base catalyst for catalyst 14) due to contraction of the pores by the surface tension of the water as it evaporated.

Method C

Catalyst 23 was prepared by wetting catalyst 22 with deionized water and drying at 100° C. under vacuum to reduce the pore volume.

Method D

Catalysts 5, 7, and 9 were prepared by this method in order to prevent aggregation of the colloidal silica particles during the methanol drying step in Method A. The silica (5 g) was placed in an activator tube with a stream of dry nitrogen flowing through it. Then 0.08 mL of chromyl chloride (1.0% Cr based on the weight of silica) was injected into the nitrogen stream below the silica. The chromyl chloride slowly evaporated and was carried by the nitrogen into the silica where it reacted. The fluidizing gas was changed to air and the temperature was raised to 750° C. for 3 hr to give the activated catalyst.

Colloidal silicas are very fluffy and do not fluidize well. This allowed a portion of the chromyl chloride to pass through the silica without reacting. Plasma digestate analysis showed that catalysts 5, 7, and 9 contained only 0.88, 0.73, and 0.50% Cr, respectively.

Method E

Commercial catalysts which contained Cr were simply activated as described below.

Catalyst 32—Silbond 40 (200 mL), 200 mL of 1-propanol, and 10 mL of concentrated ammonium hydroxide were stirred for 5 min at room temperature. Titanium isopropoxide (10 mL) was added and stirred for 5 min to give 1.5% Ti. Deionized water (40 mL) was then added and gelation occurred within 30 sec giving a clear gel, which was aged 84 hr at room temperature and 2 hr at reflux. It was then dried at 80° C. under vacuum for 24 hr to give the titanated silica. This silica was wetted with a solution of chromium nitrate in methanol, and dried at 100° C. under vacuum to give 1% Cr.

Catalyst 35—Prepared as catalyst 32, except no titanium isopropoxide was added.

Addition of Sodium—Prepared as catalysts 32 or 35, except sodium nitrate was added to the chromium nitrate/methanol solution to give the desired amount of sodium in the final catalyst.

Catalyst 33=32+1110 ppm Na
Catalyst 34=32+1850 ppm Na
Catalyst 36=35+1110 ppm Na
Catalyst 37=35+1850 ppm Na Catalyst Activation—While the catalyst was fluidized by a stream of dry air, the temperature was raised at a rate of 400° C./hr to the desired temperature, where it was held for 3 hr. After cooling to room temperature, the catalyst was flushed with nitrogen giving the activated catalyst.

Polymerizations—All polymerizations were carried out in a 2.6 L stainless steel reactor. After flushing the reactor with nitrogen and isobutane, 0.05 to 0.10 g of catalyst was charged. This was followed by addition of 600 mL of isobutane, 0.5 mL of 0.5 wt. % TEA in heptane, and an additional 600 mL of isobutane. The reactor was then heated to temperature and the pressure was brought up to the desired level by addition of ethylene. The pressure was maintained at this level throughout the reaction by addition of ethylene at the same rate it was consumed by reaction. Polymerization time was normally 45–60 minutes, depending on the catalyst activity.

Rheology—Measurements were made at 190° C. on fluff samples which were untreated and solvent treated (dissolved in 1,2,4-trimethylbenzene at 145° C. and dried under vacuum at 125° C.

Catalyst Properties Which Give Long Chain Branching

Figure 13:
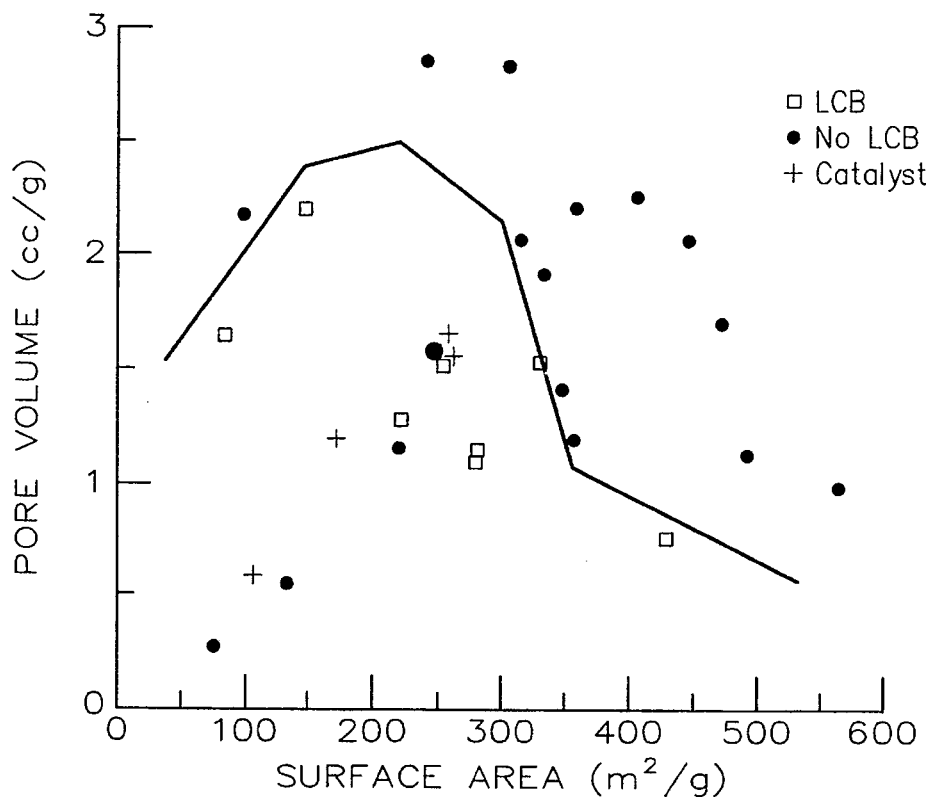
FIG. 13 is a graph of the catalyst pore volume vs. the catalyst surface area.

The results given above make it apparent that pore size is not the determining factor in long chain branch formation. The catalysts giving long chain branches have average pore radii (APR) over a wide range. Analysis of the pore size distributions showed that there is also no incremental pore size which is unique to the catalysts giving long chain branches. Instead, the production of long chain branching appears to be a function of both pore volume and surface area as shown in FIG. 13. The catalysts giving long chain branching are isolated in the low surface area and low pore volume portion of the plot. The only exceptions to this trend are catalysts 5, 7, and 9 reacted with chromyl chloride which do not give long chain branching even though they have very low pore volume and surface area. But these catalysts are very different from the other catalysts in this study because they are colloidal sized particles which were prepared under conditions to minimize aggregation of the particles. The pore size distribution shows that some aggregation occurred, but we do not know how tightly these aggregates are bound or how much of the surface area is on the outer surface rather than inside the aggregates. If the aggregates are loosely bound, they may readily break apart once polymerization begins causing them to behave more like high pore volume catalysts.

Long chain branching can also be increased by sintering the catalyst to reduce pore volume and surface area. This can be done by adding an alkali metal to reduce the catalyst sintering temperature or by using a higher activation temperature.

Conclusions

This study gives us a better understanding of what chromium oxide catalyst properties control long chain branch formation. The pore structure has a significant effect, with low pore volume and low surface area favoring long chain branch formation. Other factors which affect long chain branching are activation temperature, activation time, chromium content, and reaction temperature.

TABLE 1
CATALYSTS

| Run No. | Catalyst No. | Support | Preparation Method | Activation Temp (°C.) |
|---|---|---|---|---|
| 1 | 1 | Si | A | 750 |
| 2 | 2 | Si | E | 750 |
| 3 | 3 | Si | E | 750 |
| 4 | 4 | Si | A | 750 |
| 5 | 5 | Si | D | 750 |
| 6 | 6 | Si | A | 750 |
| 7 | 7 | Si | D | 750 |
| 8 | 8 | Si | A | 750 |
| 9 | 9 | Si | D | 750 |
| 10 | 10 | Si | A | 750 |
| 11 | 11 | Si | A | 750 |
| 12 | 12 | Si | A | 750 |
| 13 | 13 | Si | A | 750 |
| 14 | 14 | Si | B | 750 |
| 15 | 15 | Si | A | 750 |
| 16 | 16 | Si | A | 750 |
| 17 | 17 | Si | A | 750 |
| 18 | 18 | Si | A | 750 |
| 19 | 19 | Si | A | 750 |
| 20 | 20 | Si/AlPO$_4$ | E | 750 |
| 21 | 21 | Si/Ti | A | 750 |
| 22 | 22 | Si/Ti | E | 750 |
| 23 | 23 | Si/Ti | C | 750 |
| 24 | 24 | Si/Ti | E | 750 |
| 25 | 25 | Si/Ti | E | 750 |
| 26 | 26 | Si/Ti | E | 750 |

TABLE 2
CATALYST PROPERTIES

| Run No. | Catalyst No. | Surface Area(SA) (m$^2$/g) | Pore Volume (PV) (cc/g) | Pore Radius (APR) (A) |
|---|---|---|---|---|
| 1 | 1 | 253 | 1.51 | 119.4 |
| 2 | 2 | 328 | 1.53 | 93.3 |
| 3 | 3 | 278 | 1.09 | 78.4 |
| 4 | 4 | 237 | 2.86 | 241.1 |
| 5 | 5 | 218 | 1.15 | 105.5 |
| 6 | 6 | 96 | 2.18 | 454.2 |
| 7 | 7 | 75 | 0.285 | 76.0 |
| 8 | 8 | 144 | 2.21 | 306.9 |
| 9 | 9 | 132 | 0.555 | 84.1 |
| 10 | 10 | 428 | 0.749 | 35.0 |
| 11 | 11 | 109 | 0.229 | 42.0 |
| 12 | 12 | 564 | 0.993 | 35.2 |
| 13 | 13 | 302 | 2.84 | 188.1 |
| 14 | 14 | 312 | 2.07 | 132.7 |
| 15 | 15 | 356 | 1.19 | 66.9 |
| 16 | 16 | 356 | 2.22 | 124.7 |
| 17 | 17 | 346 | 1.41 | 81.5 |
| 18 | 18 | 101 | 0.799 | 158.2 |
| 19 | 19 | 82 | 1.66 | 404.9 |
| 20 | 20 | 220 | 1.27 | 115.4 |
| 21 | 21 | 403 | 2.26 | 112.2 |
| 22 | 22 | 443 | 2.07 | 93.5 |
| 23 | 23 | 490 | 1.13 | 46.1 |
| 24 | 24 | 469 | 1.7 | 72.5 |
| 25 | 25 | 331 | 1.92 | 116.0 |
| 26 | 26 | 280 | 1.15 | 82.1 |

TABLE 3
ACTIVITY OF CATALYSTS
(Activ Temp = 750° C., Reaction Temp = 100° C., 2.0 ppm TEA)

| Run No. | Catalyst No. | Productivity (g/g) | Time (min) | Activity (g/g-hr) |
|---|---|---|---|---|
| 1 | 1 | 2185 | 45 | 2910 |
| 2 | 2 | 2382 | 30 | 4764 |
| 3 | 3 | 2030 | 50 | 2440 |
| 4 | 4 | 2110 | 60 | 2110 |
| 5 | 5 | 873 | 60 | 873 |
| 6 | 6 | 371 | 60 | 371 |
| 7 | 7 | 745 | 60 | 745 |
| 8 | 8 | 762 | 60 | 762 |
| 9 | 9 | 840 | 70 | 720 |
| 10 | 10 | 906 | 60 | 906 |
| 11 | 11 | 0 | 70 | 0 |
| 12 | 12 | 2239 | 45 | 2986 |
| 13 | 13 | 3900 | 60 | 3900 |
| 14 | 14 | 2450 | 45 | 3266 |
| 15 | 15 | 1320 | 60 | 1320 |
| 16 | 16 | 1598 | 60 | 1598 |
| 17 | 17 | 2892 | 40 | 4338 |
| 18 | 18 | 193 | 70 | 166 |
| 19 | 19 | 2073 | 60 | 2073 |
| 20 | 20 | 2399 | 45 | 3198 |
| 21 | 21 | 3052 | 45 | 4070 |
| 22 | 22 | 4044 | 35 | 6933 |
| 23 | 23 | 2277 | 45 | 3035 |
| 24 | 24 | 2514 | 30 | 5028 |
| 25 | 25 | 7402 | 52 | 8541 |
| 26 | 26 | 2620 | 45 | 3493 |

TABLE 4

RHEOLOGY DATA

| Run No. | Catalyst No. | Viscosity (0.1 r/s) (poise × $10^{-5}$) | tan delta | Viscosity (100 r/s) (poise × $10^{-5}$) | G(x) (dyne/cm$^2$ × $10^{-5}$) | Shear Response |
|---|---|---|---|---|---|---|
| 1 | 1 | 8.739 | 1.112 | 18.995 | 1.227 | 46.01 |
| 2 | 2 | 9.895 | 1.131 | 22.048 | 1.666 | 44.88 |
| 3 | 3 | 15.605 | 1.044 | 28.601 | 1.403 | 54.563 |
| 4 | 4 | 27.231 | 1.045 | 40.857 | 2.395 | 66.649 |
| 5 | 5 | 25.732 | 0.993 | 39.696 | 1.756 | 64.824 |
| 6 | 6 | 57.087 | 0.709 | 46.516 | 1.026 | 122.727 |
| 7 | 7 | 54.492 | 0.644 | 43,735 | 0.151 | 124.594 |
| 8 | 8 | 36.66 | 0.871 | 41.931 | 1.137 | 87.421 |
| 9 | 9 | 32.239 | 0.901 | 44.623 | 1.124 | 72.249 |
| 10 | 10 | 20.575 | 0.974 | 31.245 | 1.264 | 65.85 |
| 11 | 11 | — | — | — | — | — |
| 12 | 12 | 27.274 | 0.946 | 35.738 | 1.555 | 76.317 |
| 13 | 13 | 12.3 | 1.29 | 29.376 | 3.73 | 41.87 |
| 14 | 14 | 11.535 | 1.205 | 27.542 | 2.515 | 41.881 |
| 15 | 15 | 15.587 | 1.083 | 28.109 | 1.616 | 55.451 |
| 16 | 16 | 12.39 | 1.19 | 27.238 | 2.133 | 45.487 |
| 17 | 17 | 15.945 | 1.117 | 31.068 | 2.019 | 51.324 |
| 18 | 18 | 60.799 | 0.508 | 35.641 | 0.434 | 170.585 |
| 19 | 19 | 65.223 | 0.451 | 29.787 | 0.824 | 218.965 |
| 20 | 20 | 13.488 | 0.94 | 20.326 | 0.664 | 66.361 |
| 21 | 21 | 3.868 | 1.605 | 16.017 | 4.615 | 24.149 |
| 22 | 22 | 3.932 | 1.559 | 15.999 | 4.351 | 24.573 |
| 23 | 23 | 11.121 | 1.139 | 23.048 | 1.668 | 48.249 |
| 24 | 24 | 4.224 | 1.439 | 14.817 | 3.029 | 28.507 |
| 25 | 25 | 4.471 | 1.499 | 16.717 | 3.966 | 26.745 |
| 26 | 26 | 8.588 | 1.199 | 20.724 | 1.802 | 41.438 |

The crossover modulus -G(x)- is the modulus at the point where the storage modulus -G'- is equal to the loss modulus -G"-.

TABLE 5

MOLECULAR WEIGHTS OF POLYETHYLENES

| Run No. | Catalyst | MI | HLMI | $M_w$/1000a | $M_n$/1000 | HI | Intrinsic Viscosity |
|---|---|---|---|---|---|---|---|
| 1 | 1 | 0.02 | 7.30 | 234 | 20.8 | 11.2 | 2.33 |
| 2 | 2 | 0.04 | 6.75 | 227 | 20.3 | 11.2 | 2.36 |
| 3 | 3 | 0.01 | 2.13 | 239 | 21 | 11.4 | 2.48 |
| 4 | 4 | 0.00 | 0.51 | 284 | 17.9 | 15.9 | 2.84 |
| 5 | 5 | 0.00 | 1.01 | (458) | — | — | 3.98 |
| 6 | 6 | 0.00 | 0.16 | 378 | 23 | 16.4 | 3.52 |
| 7 | 7 | 0.00 | 0.16 | (560) | — | — | 4.61 |
| 8 | 8 | 0.00 | 0.27 | 260 | 18.5 | 14.1 | 2.71 |
| 9 | 9 | 0.00 | 0.39 | (491) | — | — | 4.19 |
| 10 | 10 | 0.01 | 1.42 | 247 | 20.4 | 12.1 | 2.55 |
| 11 | 11 | — | — | — | — | — | — |
| 12 | 12 | 0.00 | 0.79 | 401 | 25.9 | 15.5 | 3.39 |
| 13 | 13 | 0.03 | 3.32 | 247 | 18.2 | 13.6 | 2.52 |
| 14 | 14 | 0.05 | 3.59 | 335 | 26 | 12.9 | 2.97 |
| 15 | 15 | 0.00 | 2.20 | 366 | 24.6 | 14.9 | 3.21 |
| 16 | 16 | 0.00 | 3.57 | 295 | 23.7 | 12.4 | 2.76 |
| 17 | 17 | 0.00 | 2.80 | 294 | 18.5 | 15.8 | 2.81 |
| 18 | 18 | 0.00 | 0.18 | (431) | — | — | 3.81 |
| 19 | 19 | 0.00 | 0.08 | 360 | 20.7 | 17.5 | 3.51 |
| 20 | 20 | 0.00 | 1.00 | 315 | 24.4 | 12.9 | 2.86 |
| 21 | 21 | 0.21 | 16.54 | 193 | 14 | 13.8 | 2.08 |
| 22 | 22 | 0.15 | 14.51 | 188 | 15.7 | 11.9 | 2.02 |
| 23 | 23 | 0.00 | 3.75 | 301 | 25.3 | 11.9 | 2.82 |
| 24 | 24 | 0.17 | 17.48 | 187 | 10 | 18.7 | 1.98 |
| 25 | 25 | 0.17 | 17.48 | 195 | 10.4 | 18.8 | 2.04 |
| 26 | 26 | 8.18 | 8.18 | 226 | 14.2 | 15.9 | 2.25 |

TABLE 6

Results of LCB Analysis

Catalysts Giving LCB:

| | |
|---|---|
| 1 | 10 |
| 29 | 19 |
| 2 | 20 |
| 3 | 20 |
| 8 | |

Catalysts Giving No (or low) LCB:

| | |
|---|---|
| 4 | 15 |
| 5 | 16 |
| 6 | 17 |
| 7 | 21 |
| 9 | 22 |
| 12 | 23 |
| 13 | 24 |
| 14 | 25 |

Inconclusive Results:

18

Inactive Catalyst:

11

TABLE 7

Properties of a Catalyst with Varied Activation Temperatures

| Run No. | Activation Temp (°C.) | Catalyst No. | Surface Area (m$^2$/g) | Pore Volume (cc/g) | Ave. Pore Radius (A) | Activity (g/g-hr) |
|---|---|---|---|---|---|---|
| 27 | 450 | 29A | 255 | 1.68 | 131.8 | 2350 |
| 28 | 600 | 29B | 259 | 1.56 | 120.5 | 4017 |
| 29 | 750 | 29C | 245 | 1.57 | 128.2 | 3966 |
| 30 | 900 | 29D | 170 | 1.20 | 141.2 | 3281 |

TABLE 7-continued

Properties of a Catalyst with Varied Activation Temperatures

| Run No. | Activation Temp (°C.) | Catalyst No. | Surface Area (m²/g) | Pore Volume (cc/g) | Ave. Pore Radius (A) | Activity (g/g-hr) |
|---|---|---|---|---|---|---|
| 31 | 1000 | 29E | 106 | 0.598 | 112.6 | 801 |

TABLE 8

Effect of Catalyst Activation Temperature on Polyethylene Produced from Catalyst 29
(Rxn Temp = 100° C., 2 ppm of TEA)

| Run No. | Activation Temp. (°C.) | MI | HLMI | $M_w$/1000 | $M_n$/1000 | HI | Intrinsic Viscosity |
|---|---|---|---|---|---|---|---|
| 27 | 450 | — | 0.40 | — | — | — | 4.27 |
| 28 | 600 | — | 1.41 | — | — | — | 3.06 |
| 29 | 750 | — | 3.29 | 236 | 25.2 | 9.4 | 2.43 |
| 30 | 900 | 0.03 | 6.00 | 225 | 17.4 | 13.0 | 2.29 |
| 31 | 1000 | — | 3.25 | 197 | 27.7 | 7.1 | 2.19 |

| Run No. | Viscosity (0.1 r/s) (poise × $10^{-5}$) | Tan Delta | Viscosity (100 r/s) (poise × $10^{-3}$) | Crossover Modulus (dyne/cm² × $10^{-5}$) | Shear Response |
|---|---|---|---|---|---|
| 27 | 33.288 | 0.851 | 37.929 | 0.999 | 87.763 |
| 28 | 22.935 | 0.956 | 34.145 | 1.266 | 67.171 |
| 29 | 13.692 | 1.052 | 26.351 | 1.324 | 51.959 |
| 30 | 11.986 | 0.964 | 20.539 | 0.679 | 58.357 |
| 31 | 20.146 | 0.818 | 25.950 | 0.425 | 77.634 |

TABLE 9

Properties of Catalysts with Varying Na
(activation temp = 750° C.)

| Run No. | LCB? | ppm Na added | % Ti | Catalyst No. |
|---|---|---|---|---|
| 32 | NO | 0 | 1.5 | 32 |
| 33 | NO | 1110 | 1.5 | 33 |
| 34 | NO | 1850 | 1.5 | 34 |
| 35 | NO | 0 | 0 | 35 |
| 36 | YES | 1110 | 0 | 36 |
| 37 | YES | 1850 | 0 | 37 |

| Run No. | Activity (g/g-hr) | Surface Area (m²/g) | Pore Volume (cc/g) | Ave. Pore Radius (Å) |
|---|---|---|---|---|
| 32 | 1331 | 491 | 1.59 | 64.8 |
| 33 | 1995 | 390 | 1.25 | 64.1 |
| 34 | 1837 | 376 | 1.26 | 67.0 |
| 35 | 1751 | 364 | 2.17 | 119 |
| 36 | 3694 | 326 | 1.99 | 122 |
| 37 | 3627 | 300 | 1.89 | 126 |

TABLE 10

Effect of Catalyst Na Content on Polyethylene Properties
(Active Temp = 750° C., Reaction Temp = 100° C., 2.0 ppm TEA)

| Run No. | MI | HLMI | $M_w$/1000 | $M_n$/1000 | HI | Intrinsic Viscosity |
|---|---|---|---|---|---|---|
| 32 | 0.02 | 1.43 | 315 | 16.8 | 18.7 | 2.93 |
| 33 | 0.03 | 5.53 | 234 | 21.8 | 10.7 | 2.39 |
| 34 | 0 | 5.60 | 235 | 16.3 | 14.4 | 2.37 |
| 35 | 0.007 | 1.67 | 320 | 27.7 | 11.5 | 2.02 |
| 36 | — | 6.51 | 221 | 16.0 | 13.9 | 2.31 |
| 37 | 0 | 3.98 | 216 | 16.2 | 13.4 | 2.30 |

| Run No. | Viscosity (0.1 r/s) (poise × $10^{-5}$) | Tan Delta | Viscosity (100 r/s) (poise × $10^{-3}$) | Crossover Modulus (dyne/cm² × $10^{-5}$) | Shear Response |
|---|---|---|---|---|---|
| 32 | 21.602 | 0.907 | 30.217 | 0.835 | 71.489 |
| 33 | 12.819 | 0.961 | 22.478 | 0.732 | 57.031 |
| 34 | 12.715 | 0.952 | 21.586 | 0.701 | 58.904 |
| 35 | 21.225 | 0.929 | 32.639 | 0.997 | 65.029 |
| 36 | 13.913 | 0.871 | 30.869 | 0.509 | 66.667 |
| 37 | 13.939 | 0.858 | 20.508 | 0.471 | 67.968 |

TABLE 11

Sodium Content of Catalysts

| No. | Catalyst | ppm Na |
|---|---|---|
| LCB Catalysts | 29 | 952 |
| | 1 | 422 |
| | 2 | 667 |
| | 3 | 589 |
| | 8 | <53 |
| | 10 | 329 |
| | 19 | 2220 |
| | 20 | 193 |
| | 26 | 912 |
| Non-LCB Catalysts | 4 | <60 |
| | 6 | <54 |
| | 12 | 152 |
| | 13 | 202 |
| | 15 | <52 |
| | 16 | 59 |
| | 17 | 426 |
| | 21 | 136 |
| | 22 | 414 |
| | 24 | 452 |
| | 25 | 353 |

TABLE 12

Effect of Chromium Content
(Catalyst 38: PV = 2.52 cc/g, SA = 270 m²/g, APR = 186.7 Å (Si/Ti support)
Activation Temperature = 850° C., run at 105° C. with 1.0 mL of 0.5 wt % TEA)

| Run No. | Catalyst No. | % Cr | MI | HLMI | $M_w$/1000 | $M_n$/1000 | HI | I.V. (calc) | I.V. (meas) |
|---|---|---|---|---|---|---|---|---|---|

TABLE 12-continued

Effect of Chromium Content
(Catalyst 38: PV = 2.52 cc/g, SA = 270 m$^2$/g, APR = 186.7 Å (Si/Ti support)
Activation Temperature = 850° C., run at 105° C. with 1.0 mL of 0.5 wt % TEA)

| 38 | 38A | 0.01 | 1.3  | 61 | 102 | 13.3 | 7.7  | 1.37 | 1.75 |
|----|-----|------|------|----|-----|------|------|------|------|
| 39 | 38B | 0.1  | 1.9  | 88 | 105 | 12.4 | 8.5  | 1.35 | 2.26 |
| 40 | 38C | 0.4  | 2.1  | 96 | 105 | 11.7 | 9.0  | 1.33 | 2.11 |
| 41 | 38D | 1.0  | 0.66 | 40 | 122 | 9.5  | 12.9 | 1.48 | 2.05 |

| Run No. | Viscosity (0.1 r/s) (poise × 10$^{-5}$) | Tan Delta | Viscosity (100 r/s) (poise × 10$^{-3}$) | Crossover Modulus (dyne/cm$^2$ × 10$^{-5}$) | Shear Response |
|---|---|---|---|---|---|
| 38 | 1.049 | 2.762 | 10.696 | 9.160 | 9.812  |
| 39 | 1.019 | 2.087 | 8.210  | 7.585 | 12.412 |
| 40 | 1.438 | 1.731 | 8.693  | 5.969 | 16.547 |
| 41 | 2.684 | 1.401 | 11.107 | 3.448 | 24.163 |

TABLE 13

Effect of Reaction Temperature
(Catalyst 25A: Activated at 750,*
Run with 0.5 mL of 0.5 wt % TEA)

| Run No. | Catalyst No. | Rxn Temp | MI | HLMI | M$_w$/1000 | M$_n$/1000 | HI | I.V. (calc) | I.V. (meas) |
|---|---|---|---|---|---|---|---|---|---|
| 42 | 25A | 85  | 0    | 1.92 | 244  | 13.0 | 18.8 | 2.51 | 3.68 |
| 43 | 25A | 100 | 0.46 | 36.4 | 144  | 11.1 | 12.9 | 1.66 | 2.01 |
| 44 | 25A | 108 | 3.48 | 174  | 89.4 | 9.2  | 9.8  | 1.20 | 1.35 |

| Run No. | Viscosity (0.1 r/s) (poise × 10$^{-5}$) | Tan Delta | Viscosity (100 r/s) (poise × 10$^{-3}$) | Crossover Modulus (dyne/cm$^2$ × 10$^{-5}$) | Shear Response |
|---|---|---|---|---|---|
| 42 | 25.098 | 0.885 | 32.190 | 1.068 | 77.966 |
| 43 | 2.986  | 1.473 | 12.367 | 3.483 | 24.144 |
| 44 | 0.557  | 2.793 | 6.269  | 9.888 | 8.881  |

EXAMPLE TWO

Chromium Concentration

A series of catalysts was made, catalyst A, catalyst B, catalyst C, catalyst D, and catalyst E with Cr levels varied from 0.2 to 3.0 wt %. Catalyst A was activated at 1100° and 1500° F. All other catalysts were activated at 1100° F. As shown in Table 14, some sintering of the high pore volume catalysts occurred at high Cr levels. It is unclear whether the sintering is actually caused by the Cr or by an impurity in the Cr solution. The sintering is most evident in catalyst A where the surface area dropped from 430 m$^2$/g at 0.2% Cr to 303 m$^2$/g at 3.0% Cr. Some sintering also occurred in 1100° F. catalyst A and catalyst C. However, with the catalyst C and catalyst D, no sintering appears to have occurred at high Cr levels. This is most likely due to the lower pore volume of catalysts C and D making them more difficult to sinter.

Table 15 shows the % conversion of Cr$^{+3}$ to Cr$^{+6}$ with each catalyst. The % conversion is dependent on the surface area of the catalyst, with the higher surface area catalysts supporting more Cr$^{+6}$. On all catalysts except catalyst C, approximately 0.75 Cr$^{-6}$/nm$^2$ can be supported at 1100° F. activation. With catalyst C, the Cr$^{-6}$ saturation level is approximately 0.70 Cr$^{-6}$/am$^2$. When the activation temperature is increased to 1500° F., the saturation level on catalyst A decreases from 0.75 to 0.6–0.65 Cr$^{+6}$/nm$^2$.

Each of these catalysts was used to produce ethylene homopolymer in the bench-scale reactors. The reactor conditions and polymer properties are shown in Tables 16–20.

FIGS. 14 and 15 show the changes in molecular weight distribution as the Cr concentration is changed on 1500° F. A. The molecular weight distribution shifts to lower molecular weight as the Cr increases from 0.2 to 0.6 wt %. Above 0.6 wt %, the Cr concentration has no effect on the molecular weight distribution.

It appears that using more than 0.2–0.3 Cr$^{+6}$/nm$^2$ has no effect on molecular weight distribution. However, as shown in FIGS. 16 and 17, the rheology of the polyethylene does not show this saturation effect. Tan delta decreases and eta$_{0.1}$/eta$_{100}$ increases as Cr increases from 0.2 to 3.0 wt % Cr. With all catalysts in this study, the theological properties continue to change as long as more Cr$^{+6}$ can be supported on the catalyst.

Since the molecular weight distribution does not change at >0.2–3.0 Cr$^{+6}$/nm$^2$, the rheological changes at high Cr levels must be caused by increased levels of long chain branching. When TEA was added to the reactor, it increased the activity of catalysts activated at low temperature, but had no effect on the activity of catalyst A activated at 1500° F. This is not surprising since at low activation temperature, the catalyst surface is not dehydroxylated well. This leaves more inactive sites which can be activated by the TEA. But at high activation temperatures, the surface is dehydrated more and the catalyst activity is much higher, suggesting that a higher percentage of the Cr sites are active. Since the number of active sites may be close to saturation without TEA, the TEA has little effect on activity.

In view of the above results, TEA increases the shear response with catalysts activated at low temperatures (FIG. 18), but has no effect on shear response at high activation temperatures (FIG. 19). TEA appears to increase shear response only when it also increases activity.

With every catalyst In this example, TEB gave a dramatic increase in shear response (FIGS. 18 and 19). But unlike TEA, it does not increase the catalyst activity. So the increase in shear response is probably not caused by a higher density of active sites. Instead, it is due to a change in the properties of the active Cr sites.

These catalysts are all commercially available.

Catalyst E support—500 g of Catalyst E was heated in the muffle furnace at 550° C. for 5 hr to convert the $Cr^{+3}$ to $Cr^{+6}$. It was then washed with deionized water at 80° C. until the color of the filtrate indicated that most of the Cr had been removed. It was washed three times in 4 L of 1-propanol at 80° C. and dried overnight in the vacuum oven at 100° C. A 5–10 g portion of the dried catalyst E was activated at 593° C. in air for 3 hr. Titration of this activated catalyst showed that the washed catalyst E contained only 0.077 wt % $Cr^{+6}$. This residual amount of Cr was taken into consideration when the various Cr levels were added to the catalyst so that the total Cr levels reported are the sum of the residual Cr and the added Cr.

Catalyst B support—The catalyst B support was made by the same method described above. The amount of residual Cr found in it was 0.008 wt %.

Catalyst D—Catalyst C was dried at 150° C. for 3 hr while being fluidized with nitrogen. It was then slurried in dry hexane under a nitrogen atmosphere and 15.5 ml of titanium(IV) isopropoxide was added to give 2% Ti on the catalyst C. This was reacted for 2 hr at room temperature with occasional shaking of the flask. The catalyst D was dried at 100° C. under a nitrogen atmosphere.

Addition of Cr—The desired amount of chromium(III) nitrate nonahydrate was dissolved in enough methanol to completely fill the pores of the catalyst. The catalyst and solution were mixed well by shaking, then the catalyst was dried overnight in the vacuum oven at 100° C.

$Cr^{+6}$ Titrations—The catalyst (0.5–1.0 g) was placed in approximately 25 ml of water, 25 ml of 18N sulfuric acid, and 4 drops of a 0.025M solution of 1,10-phenanthroline iron(II) sulfate in water. This was titrated to the orange-red endpoint with a standardized ferrous ammonium sulfate solution.

Pore volume and Surface Area—measured by nitrogen adsorption.

Ethylene Polymerizations—All polymerizations were done in a 2.6 L autoclave. After flushing the reactor with nitrogen and isobutane, 0.05–0.10 g of catalyst was added, followed by 1.2 L of isobutane. The reactor was heated to the reaction temperature and pressured to 550 psig with ethylene. Ethylene was fed to the reactor on demand to maintain a constant pressure. Reactions were run to a productivity of approximately 3000 g/g except in a few cases where the catalyst activity was low.

When desired, a solution of 0.5 wt % TEA or 1.0 wt % TEB in heptane was added from a charge vessel after 600 ml of isobutane had been added.

Rheology Measurements—The polyethylene samples were compression molded into plaques at 180° C. Rheological measurements were then made on disk shaped samples which were punched from the plaques. Rheological data was obtained from a Rheometrics Dynamic Spectrometer (Model RMS-7700) at 190° C. under a nitrogen atmosphere.

In these examples the crossover modulus --G(x)-- is the modulus at the point where the storage modulus --G'-- is equal to the loss modulus --G"--.

Although the present invention has been described in considerable detail with reference to certain preferred versions thereof, other versions are possible. Therefore, the spirit and scope of the appended claims should not be limited to the description of the preferred versions contained herein.

TABLE 14

Effect of Cr Level on Pore Volume and Surface Area
All catalysts were activated in air for 3 hr at the temperature shown

| Catalyst | Wt % Total Cr | Pore Volume (cc/g) | Surface Area m²/g |
|---|---|---|---|
| A | 0.2 | 2.49 | 456 |
| 1100° F. | 0.4 | 2.49 | 452 |
|  | 0.6 | 2.43 | 435 |
|  | 0.8 | 2.43 | 441 |
|  | 1.0 | 2.43 | 440 |
|  | 2.0 | 2.23 | 403 |
| C | 0.2 | 1.56 | 270 |
| 1100° F. | 0.6 | 1.58 | 277 |
|  | 1.0 | 1.64 | 290 |
|  | 2.0 | 1.70 | 287 |
|  | 3.0 | 1.53 | 265 |
| E | 0.2 | 2.12 | 559 |
| 1100° F. | 0.6 | 1.93 | 501 |
|  | 1.0 | 2.08 | 540 |
|  | 2.0 | 1.99 | 533 |
|  | 3.0 | 1.85 | 514 |
| D | 0.2 | 1.56 | 270 |
| 1100° F. | 0.6 | 1.58 | 277 |
|  | 1.0 | 1.64 | 290 |
|  | 2.0 | 1.70 | 287 |
|  | 3.0 | 1.53 | 265 |
| A | 0.2 | 2.35 | 430 |
| 1500° F. | 0.4 | 2.34 | 4.29 |
|  | 0.6 | 2.31 | 423 |
|  | 0.8 | 2.46 | 455 |
|  | 1.0 | 2.25 | 411 |
|  | 2.0 | 2.14 | 392 |
|  | 3.0 | 1.52 | 303 |

TABLE 15

Amount of $Cr^{+6}$ Supported on Various Catalysts

| Catalyst | Wt % Total Cr | Wt % $Cr^{+6}$ | % Conversion | $Cr^{+6}nm^2$ |
|---|---|---|---|---|
| A | 0.2 | 0.184 | 92 | 0.047 |
| 1100° F. | 0.4 | 0.368 | 92 | 0.094 |
|  | 0.6 | 0.565 | 94 | 0.150 |
|  | 0.8 | 0.721 | 90 | 0.190 |
|  | 1.0 | 0.923 | 92 | 0.243 |
|  | 2.0 | 1.74 | 87 | 0.500 |
|  | 3.0 | 2.52 | 84 | —[1] |
| B | 0.2 | 0.166 | 83 | 0.057 |
| 1100° F. | 0.6 | 0.513 | 86 | 0.175 |
|  | 1.0 | 0.847 | 85 | 0.289 |
|  | 2.0 | 1.68 | 84 | 0.574 |
|  | 3.0 | 2.17 | 72 | 0.741 |
| C | 0.2 | 0.173 | 87 | 0.074 |
| 1100° F. | 0.4 | 0.357 | 89 | 0.158 |
|  | 0.6 | 0.501 | 84 | 0.209 |
|  | 1.0 | 0.800 | 80 | 0.319 |
|  | 2.0 | 1.43 | 72 | 0.577 |
|  | 3.0 | 1.57 | 52 | 0.686 |
| E | 0.2 | 0.148 | 74 | 0.031 |
| 1100° F. | 0.6 | 0.448 | 75 | 0.104 |
|  | 1.0 | 0.806 | 81 | 0.173 |

TABLE 15-continued

| Amount of Cr$^{+6}$ Supported on Various Catalysts | | | | |
|---|---|---|---|---|
| Catalyst | Wt % Total Cr | Wt % Cr$^{+6}$ | % Conversion | Cr$^{+6}$nm$^2$ |
| | 2.0 | 1.78 | 89 | 0.387 |
| | 3.0 | 2.53 | 84 | 0.571 |
| D 1100° F. | 0.2 | 0.176 | 88 | 0.076 |
| | 0.6 | 0.515 | 86 | 0.226 |
| | 1.0 | 0.824 | 82 | 0.364 |
| | 2.0 | 1.51 | 76 | 0.705 |
| | 3.0 | 1.71 | 57 | 0.764 |
| A 1500° F. | 0.2 | 0.214 | 100 | 0.058 |
| | 0.4 | 0.416 | 100 | 0.112 |
| | 0.6 | 0.534 | 89 | 0.146 |
| | 0.8 | 0.685 | 86 | 0.174 |
| | 1.0 | 0.907 | 91 | 0.256 |
| | 2.0 | 1.48 | 74 | 0.438 |
| | 3.0 | 1.61 | 54 | 0.616 |

The surface area measurement for 1100° F. A with 3% Cr has not been completed.
Surface area measurements on the Catalyst B were not completed, so the Cr$^{+6}$/nm$^2$ values are based on an estimated surface are of 335 m$^2$/g.

TABLE 16

| Properties of Polyethylene Produced with 1100° F. A | | | | | | | | | | | | | |
|---|---|---|---|---|---|---|---|---|---|---|---|---|---|
| Catalyst | % Cr | Rxn Temp (°C.) | Cocatalyst (5 ppm) | Max Activity (g/g catalyst-hr) | HLMI | M$_w$/1000 | M$_n$/1000 | M$_w$/M$_n$ | G$_{x-5}$ (×10) (dynes/cm$^2$) | Tan Delta | eta$_{0-5}$ (×10) (poise) | eta$_{100}$ (×10) (poise) | eta$_{0.1}$/eta$_{100}$ |
| A 1100° F. | 0.2 | 103 | — | 700 | 4.34 | 280.9 | 16.5 | 17.0 | 5.90 | 1.63 | 9.40 | 3.30 | 28.5 |
| | 0.2 | 107 | — | 268 | 8.33 | 259.3 | 16.3 | 15.9 | 6.47 | 2.02 | 4.94 | 2.41 | 20.5 |
| | 0.4 | 103 | — | 921 | 6.46 | 314.0 | 16.1 | 19.5 | 5.48 | 1.71 | 7.29 | 2.79 | 26.1 |
| | 0.4 | 107 | — | 2153 | 7.67 | 338.9 | 19.2 | 17.6 | 6.65 | 2.03 | 4.93 | 2.44 | 20.2 |
| | 0.6 | 103 | — | 1225 | 6.18 | 308.6 | 17.9 | 17.3 | 5.75 | 1.73 | 7.57 | 2.90 | 26.1 |
| | 0.6 | 107 | — | 1055 | 8.54 | 242.6 | 12.9 | 18.9 | 7.20 | 2.10 | 4.76 | 2.49 | 19.1 |
| | 0.8 | 103 | — | 2140 | 6.41 | 330.0 | 14.1 | 23.5 | 4.87 | 1.65 | 7.11 | 2.61 | 27.2 |
| | 0.8 | 107 | — | 1583 | 9.23 | 271.5 | 12.0 | 22.7 | 7.06 | 2.09 | 4.57 | 2.40 | 19.0 |
| | 1.0 | 103 | — | 1973 | 5.50 | 277.8 | 13.2 | 21.1 | 5.41 | 1.69 | 7.71 | 2.85 | 27.1 |
| | 1.0 | 107 | — | 2003 | 9.58 | 325.1 | 21.8 | 14.9 | 5.97 | 2.01 | 4.48 | 2.20 | 20.4 |
| | 2.0 | 103 | — | 3125 | 6.89 | 348.5 | 15.1 | 23.1 | 3.92 | 1.53 | 7.59 | 2.48 | 30.6 |
| | 2.0 | 107 | — | 2682 | 10.59 | 282.2 | 15.1 | 18.7 | 5.10 | 1.88 | 4.91 | 2.16 | 19.4 |
| | 3.0 | 103 | — | 3129 | 7.34 | 355.5 | 14.0 | 25.3 | 3.01 | 1.39 | 9.34 | 2.53 | 36.9 |
| | 3.0 | 107 | — | 3034 | 9.96 | 295.4 | 12.9 | 22.9 | 3.77 | 1.65 | 5.92 | 2.12 | 27.9 |
| A 1100° F. | 0.2 | 107 | TEA | 3258 | 8.01 | 186.3 | 14.2 | 13.1 | 4.71 | 1.81 | 5.27 | 2.15 | 24.5 |
| | 0.6 | 107 | TEA | 3257 | 9.05 | 192.2 | 14.2 | 13.5 | 4.72 | 1.80 | 5.38 | 2.19 | 24.6 |
| | 1.0 | 107 | TEA | 4254 | 9.45 | 235.6 | 13.4 | 17.6 | 3.97 | 1.72 | 5.33 | 2.03 | 26.3 |
| | 2.0 | 107 | TEA | 4269 | 9.39 | 233.2 | 13.3 | 17.6 | 3.09 | 1.58 | 5.97 | 1.95 | 30.6 |
| | 3.0 | 107 | TEA | 3280 | 9.97 | 196.3 | 13.3 | 14.8 | 2.42 | 1.48 | 6.25 | 1.83 | 34.2 |
| A 1100° F. | 0.2 | 107 | TEB | 1283 | 17.06 | 184.6 | 10.5 | 17.6 | 3.23 | 1.74 | 5.20 | 1.83 | 28.4 |
| | 0.6 | 107 | TEB | 2022 | 14.78 | 160.5 | 8.0 | 20.2 | 2.00 | 1.51 | 5.10 | 1.52 | 33.6 |
| | 1.0 | 107 | TEB | 1427 | 11.42 | 233.4 | 9.4 | 24.9 | 1.92 | 1.49 | 6.84 | 1.68 | 40.7 |
| | 2.0 | 107 | TEB | 3375 | 10.97 | 181.9 | 11.4 | 16.0 | 1.82 | 1.40 | 5.91 | 1.58 | 37.4 |
| | 3.0 | 107 | TEB | 3098 | 9.50 | 223.2 | 6.9 | 32.5 | 1.10 | 1.11 | 9.98 | 1.82 | 54.8 |

TABLE 17

Properties of Polyethylene Produced with Catalyst B

| Catalyst | % Cr | Rxn Temp (°C.) | Cocatalyst (5 ppm) | Max Activity (g/g catalyst-hr) | HLMI | $M_w$/1000 | $M_n$/1000 | $M_w/M_n$ | $G_{x-5}$ (×10) (dynes/cm$^2$) | Tan Delta | eta$_{0-5}$ (×10) (poise) | eta$_{100}$ (×10) (poise) | eta$_{0.1}$/eta$_{100}$ |
|---|---|---|---|---|---|---|---|---|---|---|---|---|---|
| B 1100° F. | 0.2 | 103 | — | 1829 | 0.57 | — | — | — | 3.00 | 1.05 | 35.20 | 5.20 | 67.7 |
| | 0.2 | 107 | — | 1564 | 1.27 | 290.0 | 46.9 | 6.2 | 4.28 | 1.27 | 21.60 | 4.55 | 47.5 |
| | 0.6 | 103 | — | 3614 | 1.00 | — | — | — | 2.79 | 1.08 | 28.90 | 4.61 | 62.7 |
| | 0.6 | 107 | — | 3275 | 2.10 | 307.6 | 31.5 | 9.8 | 3.58 | 1.27 | 18.20 | 3.92 | 46.4 |
| | 1.0 | 103 | — | 3750 | 1.06 | — | — | — | 2.19 | 1.02 | 28.20 | 4.21 | 67.0 |
| | 1.0 | 107 | — | 3638 | 2.58 | 252.3 | 30.9 | 8.2 | 3.02 | 1.24 | 16.70 | 3.53 | 47.3 |
| | 2.0 | 103 | — | 2328 | 1.26 | — | — | — | 2.11 | 1.04 | 25.50 | 3.86 | 66.1 |
| | 2.0 | 107 | — | 3161 | 3.06 | 278.7 | 28.6 | 9.7 | 2.48 | 1.21 | 15.80 | 3.14 | 50.3 |
| | 3.0 | 103 | — | 3567 | 1.04 | — | — | — | 1.71 | 0.97 | 237.20 | 3.73 | 72.9 |
| | 3.0 | 107 | — | 2614 | 3.02 | 357.9 | 22.9 | 15.7 | 2.24 | 1.17 | 17.30 | 3.16 | 54.7 |
| B 1100° F. | 0.2 | 107 | TEA | 2533 | 2.00 | 322.0 | 26.6 | 12.1 | 2.90 | 1.18 | 20.40 | 3.76 | 54.3 |
| | 1.0 | 107 | TEA | 4228 | 3.17 | 257.1 | 18.1 | 14.2 | 1.84 | 1.13 | 15.40 | 2.81 | 54.8 |
| | 2.0 | 107 | TEA | 4468 | 3.38 | 244.7 | 14.2 | 17.3 | 1.31 | 1.03 | 16.30 | 2.58 | 63.2 |
| | 3.0 | 107 | TEA | 3830 | 3.02 | 262.8 | 10.9 | 24.0 | 1.07 | 0.93 | 21.20 | 2.84 | 74.6 |
| B 1100° F. | 0.2 | 107 | TEB | 1572 | 2.69 | 304.5 | 10.5 | 29.0 | 1.78 | 1.07 | 20.00 | 2.96 | 67.6 |
| | 1.0 | 107 | TEB | 3785 | 3.80 | 214.3 | 9.9 | 21.7 | 0.97 | 0.93 | 18.90 | 2.47 | 76.5 |
| | 3.0 | 107 | TEB | 3218 | 3.15 | 168.6 | 7.0 | 24.2 | 0.93 | 0.86 | 23.20 | 2.69 | 86.2 |

TABLE 18

Properties of Polyethylene Produced with Catalysts C and D

| Catalyst | % Cr | Rxn Temp (°C.) | Cocatalyst (5 ppm) | Max Activity (g/g catalyst-hr) | HLMI | $M_w$/1000 | $M_n$/1000 | $M_w/M_n$ | $G_{x-5}$ (×10) (dynes/cm$^2$) | Tan Delta | eta$_{0-5}$ (×10) (poise) | eta$_{100}$ (×10) (poise) | eta$_{0.1}$/eta$_{100}$ |
|---|---|---|---|---|---|---|---|---|---|---|---|---|---|
| C 1100° F. | 0.2 | 103 | — | 827 | 2.44 | 428.5 | 46.0 | 9.3 | 4.52 | 1.37 | 14.20 | 3.76 | 37.8 |
| | 0.2 | 107 | — | 751 | 4.52 | 266.4 | 42.9 | 6.2 | 7.88 | 1.87 | 6.08 | 2.90 | 21.0 |
| | 0.6 | 103 | — | 1871 | 2.68 | 413.6 | 38.8 | 10.6 | 3.52 | 1.28 | 14.30 | 3.46 | 41.3 |
| | 0.6 | 107 | — | 2498 | 5.85 | 279.6 | 30.1 | 9.3 | 5.22 | 1.62 | 7.61 | 2.76 | 27.6 |
| | 1.0 | 103 | — | 3133 | 4.22 | 384.0 | 37.0 | 10.4 | 3.26 | 1.28 | 11.20 | 2.88 | 38.9 |
| | 1.0 | 107 | — | 3043 | 7.73 | 364.1 | 33.3 | 10.9 | 4.25 | 1.56 | 6.70 | 2.36 | 28.4 |
| | 2.0 | 103 | — | 2573 | 3.35 | 447.0 | 33.3 | 13.4 | 2.66 | 1.23 | 14.10 | 3.09 | 45.6 |
| | 2.0 | 107 | — | 2706 | 7.79 | 323.2 | 28.1 | 11.5 | 4.84 | 1.55 | 8.58 | 2.90 | 29.6 |
| | 3.0 | 103 | — | 2355 | 2.33 | 446.9 | 35.4 | 12.6 | 2.71 | 1.20 | 16.40 | 3.39 | 48.4 |
| | 3.0 | 107 | — | 2289 | 5.01 | 398.8 | 36.9 | 10.8 | 3.76 | 1.43 | 9.82 | 2.81 | 34.9 |
| C 1100° F. | 0.2 | 107 | TEA | 2386 | 11.30 | 135.5 | 18.6 | 7.3 | 4.15 | 1.67 | 4.63 | 1.86 | 24.9 |
| | 0.4 | 107 | TEA | 3029 | 11.96 | 201.7 | 18.1 | 11.1 | 4.14 | 1.62 | 5.16 | 1.98 | 26.1 |
| | 0.6 | 107 | TEA | 4043 | 10.68 | 179.2 | 17.1 | 10.5 | 3.34 | 1.51 | 5.44 | 1.88 | 28.9 |
| | 1.0 | 107 | TEA | 3640 | 8.36 | 168.8 | 17.0 | 9.9 | 3.47 | 1.54 | 6.52 | 2.16 | 30.2 |
| | 2.0 | 107 | TEA | 3068 | 5.52 | 363.9 | 17.8 | 20.5 | 3.18 | 1.48 | 7.37 | 2.21 | 33.3 |
| | 3.0 | 107 | TEA | 3592 | 8.19 | 296.9 | 12.4 | 23.9 | 2.31 | 1.39 | 7.50 | 2.02 | 37.1 |
| C 1100° F. | 0.2 | 107 | TEB | 982 | 9.26 | 368.2 | 18.2 | 20.2 | 2.68 | 1.45 | 6.24 | 1.90 | 32.8 |
| | 1.0 | 107 | TEB | 2496 | 8.54 | 294.1 | 12.0 | 24.5 | 1.86 | 1.24 | 8.57 | 2.07 | 41.4 |
| | 3.0 | 107 | TEB | 3079 | 4.38 | 293.5 | 12.2 | 22.2 | 1.77 | 1.02 | 13.50 | 2.30 | 58.7 |
| D 1100° F. | 0.2 | 107 | — | 1570 | 24.58 | 139.4 | 16.9 | 8.2 | 6.80 | 2.15 | 2.51 | 1.61 | 15.6 |
| | 0.6 | 107 | — | 3408 | 22.86 | 145.2 | 15.5 | 9.3 | 5.39 | 1.85 | 3.05 | 1.60 | 19.1 |
| | 1.0 | 107 | — | 4103 | 18.87 | 186.9 | 19.5 | 9.6 | 4.32 | 1.72 | 3.85 | 1.69 | 22.8 |
| | 2.0 | 107 | — | 2935 | 21.40 | 155.2 | 13.8 | 11.3 | 3.98 | 1.66 | 3.87 | 1.63 | 23.7 |
| | 3.0 | 107 | — | 2545 | 20.10 | 157.1 | 14.2 | 11.1 | 3.71 | 1.64 | 4.02 | 1.63 | 24.7 |

TABLE 19

Properties of Polyethylene Produced with Catalyst E

| Catalyst | % Cr | Rxn Temp (°C.) | Cocatalyst (5 ppm) | Max Activity (g/g catalyst-hr) | HLMI | $M_w$/1000 | $M_n$/1000 | $M_w/M_n$ | $G_{x-5}$ (×10) (dynes/cm²) | Tan Delta | $eta_{0-5}$ (×10) (poise) | $eta_{100}$ (×10) (poise) | $eta_{0.1}/eta_{100}$ |
|---|---|---|---|---|---|---|---|---|---|---|---|---|---|
| E | 0.2 | 103 | — | 1577 | 1.59 | 411.1 | 28.3 | 14.5 | 4.18 | 1.26 | 21.60 | 4.49 | 48.1 |
| 1100° F. | 0.2 | 107 | — | 1040 | 2.84 | 318.6 | 30.0 | 10.6 | 5.98 | 1.59 | 13.10 | 3.96 | 33.1 |
|  | 0.6 | 103 | — | 2447 | 2.10 | 341.5 | 24.4 | 14.0 | 3.81 | 1.30 | 17.70 | 3.93 | 45.0 |
|  | 0.6 | 107 | — | 3030 | 3.43 | 346.2 | 26.7 | 13.0 | 5.53 | 1.58 | 11.40 | 3.58 | 31.8 |
|  | 1.0 | 103 | — | 4694 | 2.47 | 280.5 | 21.3 | 13.2 | 3.47 | 1.27 | 16.90 | 3.72 | 45.4 |
|  | 1.0 | 107 | — | 4217 | 4.45 | 217.0 | 22.6 | 9.6 | 4.62 | 1.61 | 9.23 | 2.98 | 31.0 |
|  | 2.0 | 103 | — | 3933 | 3.42 | 305.3 | 19.1 | 16.0 | 2.79 | 1.25 | 14.30 | 3.13 | 45.7 |
|  | 2.0 | 107 | — | 3831 | 5.81 | 279.3 | 20.5 | 13.6 | 3.81 | 1.56 | 9.04 | 2.72 | 33.2 |
|  | 3.0 | 103 | — | 3769 | 3.57 | 343.4 | 17.7 | 19.4 | 2.42 | 1.23 | 13.80 | 2.93 | 47.1 |
|  | 3.0 | 107 | — | 5158 | 6.89 | 191.6 | 18.0 | 10.7 | 3.21 | 1.50 | 8.43 | 2.44 | 34.5 |
| E | 0.2 | 107 | TEA | 3512 | 3.06 | 336.0 | 21.3 | 15.8 | 4.09 | 1.50 | 12.30 | 3.24 | 38.0 |
| 1100° F. | 1.0 | 107 | TEA | 5556 | 6.58 | 304.6 | 16.9 | 18.0 | 3.16 | 1.56 | 7.76 | 2.31 | 33.6 |
|  | 3.0 | 107 | TEA | 6209 | 7.11 | 233.8 | 13.5 | 17.3 | 1.98 | 1.34 | 8.76 | 2.06 | 42.5 |
| E | 0.2 | 107 | TEB | 1187 | 3.99 | 325.8 | 13.3 | 24.5 | 2.22 | 1.24 | 16.00 | 2.77 | 57.8 |
| 1100° F. | 1.0 | 107 | TEB | 4362 | 8.06 | 254.0 | 12.2 | 20.9 | 2.08 | 1.37 | 9.22 | 2.10 | 43.9 |
|  | 3.0 | 107 | TEB | 4206 | 6.24 | 298.0 | 13.2 | 22.6 | 1.24 | 1.09 | 11.90 | 2.10 | 56.7 |

$0.5 \leq$ Pore volume $\leq f(SA)$

TABLE 20

Properties of Polyethylene Produced with 1500° F. A

| Catalyst | % Cr | Rxn Temp (°C.) | Cocatalyst (5 ppm) | Max Activity (g/g catalyst-hr) | HLMI | $M_w$/1000 | $M_n$/1000 | $M_w/M_n$ | $G_{x-5}$ (×10) (dynes/cm²) | Tan Delta | $eta_{0-5}$ (×10) (poise) | $eta_{100}$ (×10) (poise) | $eta_{0.1}/eta_{100}$ |
|---|---|---|---|---|---|---|---|---|---|---|---|---|---|
| A | 0.2 | 103 | — | 2325 | 37.34 | 897.7 | 17.3 | 51.8 | 8.87 | 2.66 | 1.36 | 1.32 | 10.3 |
| 1500° F. | 0.2 | 107 | — | 2889 | 61.63 | 82.5 | 14.1 | 5.9 | 11.60 | 3.77 | 0.75 | 1.10 | 6.8 |
|  | 0.4 | 103 | — | 3665 | 62.09 | 76.6 | 11.4 | 6.7 | 8.46 | 2.76 | 0.92 | 0.98 | 9.4 |
|  | 0.4 | 107 | — | 3962 | 88.73 | 75.3 | 13.0 | 5.8 | 10.70 | 3.80 | 0.55 | 0.84 | 6.5 |
|  | 0.6 | 103 | — | 4600 | 59.63 | 415.2 | 15.4 | 27.0 | 8.49 | 2.72 | 0.98 | 1.01 | 9.7 |
|  | 0.6 | 107 | — | 6637 | 123.33 | 69.1 | 13.0 | 5.3 | 8.43 | 3.12 | 0.49 | 0.72 | 6.8 |
|  | 0.8 | 103 | — | 5490 | 59.76 | 81.9 | 13.1 | 6.2 | 8.46 | 2.68 | 0.99 | 1.00 | 9.9 |
|  | 0.8 | 107 | — | 7561 | 124.34 | 66.8 | 12.4 | 5.4 | 8.96 | 3.31 | 0.46 | 0.69 | 6.7 |
|  | 1.0 | 103 | — | 5640 | 58.69 | 208.5 | 13.1 | 15.9 | 8.08 | 2.54 | 1.15 | 1.08 | 10.6 |
|  | 1.0 | 107 | — | 6466 | 124.02 | 71.5 | 12.8 | 5.6 | 9.84 | 3.57 | 0.59 | 0.89 | 6.7 |
|  | 2.0 | 103 | — | 55550 | 59.96 | 77.9 | 12.6 | 6.2 | 7.56 | 2.35 | 1.19 | 1.01 | 11.8 |
|  | 2.0 | 107 | — | 6676 | 117.47 | 74.7 | 12.6 | 5.9 | 8.72 | 3.09 | 0.54 | 0.72 | 7.5 |
|  | 3.0 | 103 | — | 6298 | 51.92 | 84.5 | 12.7 | 6.7 | 6.84 | 2.19 | 1.39 | 1.07 | 13.0 |
|  | 3.0 | 107 | — | 5021 | 102.31 | 70.1 | 12.4 | 5.7 | 8.57 | 2.83 | 0.66 | 0.79 | 8.4 |
| A | 0.2 | 107 | TEA | 3352 | 68.73 | 90.0 | 12.9 | 7.0 | 8.08 | 3.39 | 0.60 | 0.83 | 7.2 |
| 1500° F. | 0.6 | 107 | TEA | 4568 | 73.51 | 101.8 | 13.0 | 7.8 | 8.05 | 3.20 | 0.64 | 0.80 | 7.7 |
|  | 1.0 | 107 | TEA | 5644 | 67.73 | 113.9 | 10.1 | 11.3 | 7.35 | 2.71 | 0.76 | 0.79 | 9.6 |
|  | 2.0 | 107 | TEA | 4717 | 50.53 | 102.7 | 12.5 | 8.3 | 6.97 | 2.43 | 0.96 | 0.84 | 11.3 |
|  | 3.0 | 107 | TEA | 5081 | 76.95 | 108.3 | 11.3 | 9.6 | 7.53 | 2.47 | 0.87 | 0.77 | 11.4 |
| A | 0.2 | 107 | TEB | 983 | 49.03 | 157.0 | 11.8 | 13.3 | 6.36 | 2.70 | 1.07 | 0.97 | 11.0 |
| 1500° F. | 0.6 | 107 | TEB | 2413 | 51.25 | 137.2 | 10.6 | 13.0 | 5.74 | 2.31 | 1.15 | 0.92 | 12.5 |
|  | 1.0 | 107 | TEB | 4613 | 59.44 | 112.3 | 10.7 | 10.5 | 4.55 | 2.10 | 1.18 | 0.81 | 14.6 |
|  | 2.0 | 107 | TEB | 4813 | 46.78 | 123.2 | 9.8 | 12.5 | 4.35 | 1.88 | 1.34 | 0.83 | 16.2 |
|  | 3.0 | 107 | TEB | 4648 | 30.13 | 118.6 | 10.3 | 11.5 | 3.59 | 1.63 | 2.14 | 1.03 | 20.8 |

That which is claimed is:

1. A process for homopolymerizing ethylene, or copolymerizing ethylene with a comonomer, to produce an ethylene polymer that has an increased amount of long chain branching and a decreased amount of die swell, said process comprising polymerizing ethylene with a chromium catalyst composition that comprises:

(a) a support that comprises silica, wherein said support has a surface area (SA) to pore volume relationship as follows wherein said f(SA) is $(1.14 \times 10^{-7})(SA)^3 - (1.19 \times 10^{-4})(SA)^2 + (3.19 \times 10^{-2})(SA) + 0.20;$ and (b) a hexavalent chromium compound; wherein the surface concentration of said hexavalent chromium on said support is from 0.4 to 1 hexavalent chromium atoms per square nanometer.

2. A process according to claim 1 wherein said support consists essentially of silica.

3. A process according to claim 2 wherein said support consists of silica.

4. A process according to claim 2 wherein said support consists essentially of silica and a refractory metal oxide selected from the group consisting of alumina, boria, magnesia, thoria, zirconia, titania, and mixtures of two or more said refractory metal oxides.

5. A process according to claim 4 wherein said support consists essentially of silica and titania.

6. A process according to claim 4 wherein said support consists of silica and titania.

7. A process according to claim 1 wherein said support has a surface area from about 50 to about 500 square meters per gram.

8. A process according to claim 1 wherein said support has a surface area from 100 to 300 square meters per gram.

9. A process according to claim 1 wherein said support has a pore volume from about 0.5 to about 2.5 cubic centimeters per gram.

10. A process according to claim 1 wherein said support has a pore volume from 1 to 2 cubic centimeters per gram.

11. A process according to claim 1 wherein the amount of said hexavalent chromium is from about 0.5 to about 5 weight percent based on the weight of said chromium compound and said support.

12. A process according to claim 1 wherein the amount of said hexavalent chromium is from about 1 to about 4 weight percent based on the weight of said chromium compound and said support.

13. A process according to claim 1 wherein the amount of said hexavalent chromium is from 1 to 3 weight percent based on the weight of said chromium compound and said support.

14. A process according to claim 1 wherein said surface concentration of said hexavalent chromium Is from about 0.25 to about 1 hexavalent chromium atoms per square nanometer.

15. A process according to claim 1 wherein said hexavalent chromium has been activated at a temperature from about 750° C. to about 1000° C.

16. A process according to claim 1 wherein said hexavalent chromium has been activated at a temperature from about 800° C. to about 1000° C.

17. A process according to claim 1 wherein said hexavalent chromium has been activated at a temperature from 800° C. to 925° C.

18. A process according to claim 1 wherein said polymerizing is conducted in the presence of a cocatalyst selected from the group consisting of trialkylaluminum compounds, trialkylboron compounds, and mixtures of said cocatalysts.

19. A process according to claim 1 wherein said polymerizing is conducted in the presence of a trialkylaluminum cocatalyst.

20. A process according to claim 19 wherein said trialkylaluminum cocatalyst is triethylaluminum.

21. A process according to claim 1 wherein said polymerizing is conducted in the presence of a trialkylboron cocatalyst.

22. A process according to claim 21 wherein said trialkylboron cocatalyst is triethylboron.

23. A process for homopolymerizing ethylene, or copolymerizing ethylene with a comonomer, to produce an ethylene polymer that has an increased amount of long chain branching and a decreased amount of die swell, said process consisting essentially of polymerizing ethylene with a chromium catalyst composition that consists essentially of:

(a) a support that is selected from the group consisting of silica and silica titania, wherein said support has a surface area (SA) to pore volume relationship as follows $$0.5 \leq \text{Pore volume} \leq f(SA)$$

wherein said f(SA) is $$(1.14 \times 10^{-7})(SA)^3 - (1.19 \times 10^{-4})(SA)^2 + (3.19 \times 10^{-2})(SA) + 0.20;$$

and (b) a hexavalent chromium compound, wherein said hexavalent chromium compound is activated at a temperature from 800° C. to 925° C.; wherein the surface concentration of said hexavalent chromium on said support is from 0.4 to 1 hexavalent chromium atoms per square nanometer.

24. A process for homopolymerizing ethylene, or copolymerizing ethylene with a comonomer, to produce an ethylene polymer that has an increased amount of long chain branching and a decreased amount of die swell, said process consisting essentially of polymerizing ethylene with a chromium catalyst composition that consists essentially of:

(a) a support that is selected from the group consisting of silica and silica/titania, wherein said support has a surface area (SA) to pore volume relationship as follows $$0.5 \leq \text{Pore volume} \leq f(SA)$$

wherein said f(SA) is $$(1.14 \times 10^{-7})(SA)^3 - (1.19 \times 10^{-4})(SA)^2 + (3.19 \times 10^{-2})(SA) + 0.20;$$

and wherein said support is calcined at a temperature from 750° C. to 1000° C.;

and (b) a hexavalent chromium compound, wherein said hexavalent chromium compound is activated at a temperature from 600° C. to 700° C.; wherein the surface concentration of said hexavalent chromium on said support is from 0.4 to 1 hexavalent chromium atoms per square nanometer, and wherein said polymerizing is conducted in the presence of a cocatalyst selected from the group consisting of triethylaluminum, triethylboron, and mixtures of said cocatalysts.

* * * * *

UNITED STATES PATENT AND TRADEMARK OFFICE
CERTIFICATE OF CORRECTION

PATENT NO. : 5,599,887

DATED : February 4, 1997

INVENTOR(S) : Rickey D. Badley, Kent W. Rollmann and Max P. McDaniel

It is certified that error appears in the above-identified patent and that said Letters Patent is hereby corrected as shown below:

Column 25, claim 1, line 66, after the word "follows" please insert "$0.5 \leq$ Pore volume $\leq f(SA)$".

Columns 25 and 26, before "TABLE 20" delete the following:

$0.5 \leq$ Pore volume $\leq f(SA)$

Signed and Sealed this

Sixth Day of May, 1997

*Attest:*

*Attesting Officer*

BRUCE LEHMAN

*Commissioner of Patents and Trademarks*